US008735496B2

(12) United States Patent
Joehnck et al.

(10) Patent No.: US 8,735,496 B2
(45) Date of Patent: May 27, 2014

(54) METHOD FOR PRODUCING HYDROPHILIC POLY-N-VINYLPYRROLIDONE AND USE THEREOF

(75) Inventors: Matthias Joehnck, Darmstadt (DE); Daniel Scheid, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 163 days.

(21) Appl. No.: 13/318,662

(22) PCT Filed: Apr. 27, 2010

(86) PCT No.: PCT/EP2010/002582
§ 371 (c)(1),
(2), (4) Date: Nov. 3, 2011

(87) PCT Pub. No.: WO2010/127789
PCT Pub. Date: Nov. 11, 2010

(65) Prior Publication Data
US 2012/0053254 A1 Mar. 1, 2012

(30) Foreign Application Priority Data

May 4, 2009 (EP) .................................... 09006069

(51) Int. Cl.
*C08F 226/08* (2006.01)
*C08F 126/08* (2006.01)

(52) U.S. Cl.
USPC ............. 525/186; 521/56; 526/204; 526/212; 526/201

(58) Field of Classification Search
None
See application file for complete search history.

(56) References Cited

U.S. PATENT DOCUMENTS

| | | | | |
|---|---|---|---|---|
| 4,053,696 | A | * | 10/1977 | Herrle et al. ..................... 526/65 |
| 4,520,180 | A | | 5/1985 | Barabas et al. |
| 5,362,815 | A | | 11/1994 | Shih et al. .................. 525/326.9 |
| 5,395,904 | A | * | 3/1995 | Zhong et al. .................. 526/264 |
| 6,187,884 | B1 | | 2/2001 | Kothrade et al. |
| 6,482,867 | B1 | | 11/2002 | Kimura et al. |
| 2008/0182955 | A1 | * | 7/2008 | Okamura ..................... 526/258 |

FOREIGN PATENT DOCUMENTS

EP 0 887 360 A1 12/1998
WO 95/22639 A2 8/1995

OTHER PUBLICATIONS

Horak, Journal of Polymer Science: Part A: Polymer Chemistry, vol. 38, 653-663 (2000).*
Paine, Macromolecules, 1990, 23, 3104-3109.*
Ugelstad, L., et al., "Monodisperse polymer particles-a step forward for chromatography," Nature, May 1983, vol. 303, pp. 95-96, Nature Publishing Group.
Kim, Ok Hyung, "Effect of PVA in dispersion polymerization of MMA," Polymer, 2006, vol. 47, pp. 1953-1959, Elsevier Ltd.
Smigol, V., et al., "High-Performance Liquid Chromatography of Complex Mixtures Using Mondisperse Dual-Chemistry Polymer Beads Prepared by a Pore-Size-Specific Functionalization Process. A Single Column Combination of Hydrophobic Interaction and Reversed-Phase Chromatography," Analytical Chemistry, Jul. 1, 1994, vol. 66, No. 13, pp. 2129-2138, American Chemical Society.
Unsal, E., et al., "Monodisperse-porous particles with different polarities by 'modified seeded polymerization' and their use as chromatographic packing in HPLC," Reactive & Functional Polymers, 2004, vol. 61, pp. 353-368, Elsevier B. V.
Unsal, F, et al., "A new affinity-HPLC packing for protein separation: Cibacron blue attached uniform porous poly (HEMA-co-EDM) beads," Anal Bioanal Chem, 2005, vol. 383, pp. 930-937.
Wu, Feiyan, et al., "Preparation of dye-ligand affinity chromatographic packings based on monodisperse poly (glycidylmethacrylate-co-ethylenedimethacrylate) beads and their chromatographic properties," Journal of Chromatography A, 2006, vol. 1134, pp. 45-50, Elsevier B.V.
Takahashi, K, "Preparation of monodisperse polymer particles from 4-vinylpyridine," 1997, vol. 18, pp. 471-475, Huthig & Wepf, Zug.
Lee, K.-C., et al., "Dispersion Polymerization of Acrylamide in t-Butyl Alcohol/Water Media," Macromolecular Research, 2004, vol. 12, No. 2, pp. 213-218.
Ellingsen, T., et al., "Monosized stationary phases for chromatography," Journal of Chromatography, 1990, vol. 535, pp. 147-161, Elsevier Science Publishers B.V., Amsterdam.
Horak, D., et al., "Reactive Poly(Glycidyl Methacrylate) Microspheres Prepared by Dispersion Polymerization," Journal of Polymer Science: Part A: Polymer Chemistry, 2000, vol. 38, pp. 3855-3863, John Wiley & Sons, Inc.
Paine, A. J., et al., "Dispersion Polymerization of Styrene in Polar Solvents. Influence of Reaction Parameters on Particle Size and Molecular Weight in Poly(N-vinylpyrrolidone)-Stabilized Reactions," Marcomolecules, 1990, vol. 23, pp. 3104-3109, American Chemical Society.
Paine, A. J., "Dispersion Polymerization of Styrene in Polar Solvents. 7. A simple Mechanistic Model to Predict Particle Size," 1990, vol. 23, pp. 3109-3117, American Chemical Society.

(Continued)

*Primary Examiner* — Robert C Boyle
(74) *Attorney, Agent, or Firm* — Millen, White, Zelano & Branigan, P.C.

(57) ABSTRACT

The present invention relates to a process for the production of the largest possible spherical, monodisperse polyvinylpyrrolidone (PVP) seed particles in the micron range by dispersion polymerisation. The particles obtained in this way represent novel starting materials for the production of macroporous polymer particles, which can in turn be employed in preparative and analytical chromatography for protein preparation. They can also be employed as base material for further reactions.
The novel process for the polymerisation of N-vinylpyrrolidone, which is inexpensive to carry out, gives particles having optimised quantities, such as monodispersity, sphericity and particle diameter, which can be employed in further reactions and have advantageous, in particular improved, properties for use in chromatographic separation methods.

20 Claims, 30 Drawing Sheets

(56) References Cited

OTHER PUBLICATIONS

Shay, J.S., et al., "Dispersion Polymerization of Polystyrene Latex Stabilized with Novel Grafted Poly(ethylene glycol: Macromers in 1-Propanol/Water," Macromolecules, 2000, vol. 33, pp. 6664-6671, American Chemical Society.

Horak, D., "Effect of reaction parameters on properties of dispersion-polymerized hydrophilic microspheres as supports for immobilization of proteins," Progr Colloid Polym Sci, 2003, vol. 124, pp. 77-81, Springer-Verlag.

Horak, D., et al., "Effect of Reaction Parameters on the Dispersion Polymerization of 1-Vinyl-2-Pyrrolidone," Journal of Polymer Science: Part A; Polymer Chemistry, 2000, vol. 38, pp. 653-663, John Wiley & Sons, Inc.

Chen, C.-H., et al., "Preparation of Methyl Methacrylate and Glycidyl Methacrylate Copolymerized Nonporous Particles," Journal of Polymer Science: Part A: Polymer Chemistry, 1999, vol. 37, pp. 1457-1463, John Wiley & Sons, Inc.

Lok, K.P., al., "Particle size control in dispersion polymerization of polystyrene," Can. J. Chem., 1987, vol. 63, pp. 209-216.

Yang, W., et al., "Dispersion copolymerization of styrene and glycidyl methacrylate in polar solvents," Colloid Polym Sci, 1999, 277:pp. 446-451; Springer-Verlag.

Ober, C., et al., "Formation of Large Monodisperse Copolymer Particles by Dispersion Polymerization," Macromolecules, 1987, vol. 20, No. 2, pp. 268-273, American Chemical Society.

Tseng, C.M., et al., "Uniform Polymer particles by Dispersion Polymerization in Alcohol," Journal of Polymer Science: Part A: Polymer Chemistry; 1986, vol. 24, pp. 2995-3007, John Wiley & Sons Inc.

Barrett K.E.J., et al., "Kinetics of Dispersion Polymerization of Soluble Monomers. I. Methyl Methacrylate," Journal of Polymer Science: Part A-1, 1969, vol. 7, pp. 2621-2650.

Ugelstad, J., et al., "Absorption of Low Molecular Weight Compounds in Aqueous Dispersions of Polymer-Oligomer Particles, 2 a), A Two Step Swelling Process of Polymer Particles Giving an Enormous Increase in Absorption Capacity," Makromol. Chem., 1979, vol. 180, pp. 737-744.

Tuncel, A., et al., "2-Hydroxyethylmethacrylate carrying uniform porous particles: preparation and electron microscopy," Polymer International, 2001, vol. 51, pp. 75-84, Society of Chemical International.

Tuncel, A., et al., "Carboxyl carrying-large uniform latex particles," Colloids and Surfaces A: Physiochemical and Engineering Aspects, 2002, vol. 197, pp. 79-94,Elsevier Science B.V.

Jose, A. J., et al., "Tuning the pore size and surface area of monodisperse Poly(Methyl Acryate) beads via parallel seeded polymerisation," Polymer, 2005, vol. 46, pp. 2880-2888, Elsevier Ltd.

Gong, Bo-Lin, et al., "Synthesis of Monodisperse Poly(glycidylmethacrylate-co-ethylene dimethacrylate) Beads and Their and Their Application in Separation of Biopolymers," Chinese Journal of Chemistry, 2004, vol. 22, No. 3, pp. 283-289.

Ugelstad, J., "Swelling Capacity of Aqueous Dispersions of Oligomer and Polymer Substances and Mixtures thereof," Makromol. Chem., 1978, vol. 179, pp. 815-817.

Soravia, S., et al., "Design of Experiments," Ullmann Moddeling and Simulation, 2006, pp. 1-38, Wiley-VCH Verlag GmbH & Co.

Kobayashi, S., et al., "Preparation of Micron-size Monodisperse Polymer Particles by Dispersion Copolymerization of Methyl Methacrylate with Poly (2-oxazoline) Macromonomer," Proceedings of Japan Academy. Ser. B. Physical and Biological Sciences, 1991, vol. 67, pp. 140-143.

Wood, C. D., et al., "Synthesis of Polystyrene by Dispersion Polymerization in 1,1,1,2-Tetrafluoroethane (R134a) Using Inexpensive Hydrocarbon Macromonomer Stabilizers," Macromolecules, 2003, vol. 36, pp. 7534-7542, American Chemical Society.

Sudol, E. D., et al., "Kinetics of Successive Seeding of Monodisperse Polystyrene Latexes. I. Initiation via Potassium Persulfate," Journal of Polymer Science: Part A; Polymer Chemistry, 1986, vol. 24, pp. 3499-3513, John Wiley & Sons, Inc.

Cheng, C.M., et al., "Synthesis and Characterization of Monodisperse Porous Polymer Particles," Journal of Polymer Science: Pat A: Polymer Chemistry, 1992, vol. 30, pp. 235-244, John Wiley & Sons, Inc.

Kumar, S.V., et al., "N-Vinylpyrrolidone and Ethoxyethyl Methacrylate Copolymer: Synthesis, Characterization and Reactivity Ratios," Journal of Macromolecular Science, Part A: Pure and Applied Chemistry, 2007, vol. 44, pp. 1161-1169, Taylor & Francis Group, LLC.

Lu, X., et al., "Controllable synthesis of poly(N-vinylpyrrolidone) and its block copolymers by atom transfer radical polymerization," Polymer, 2007, vol. 48, pp. 2835-2842, Elsevier Ltd.; Cited in ISR issued in corr. PCT/EP2010/002582 on Aug. 18, 2010.

International Search Report issued in corresponding PCT/EP2010/002582 on Aug. 18, 2010.

* cited by examiner

Fig. 16
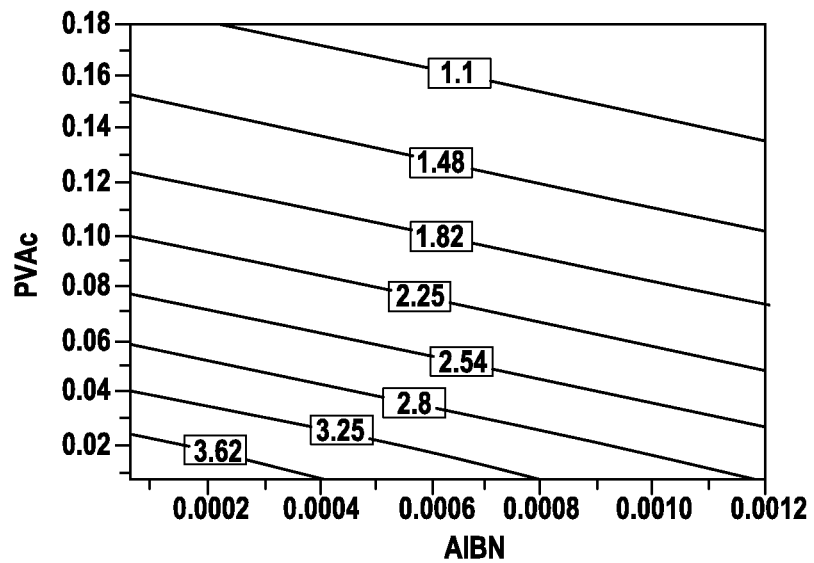
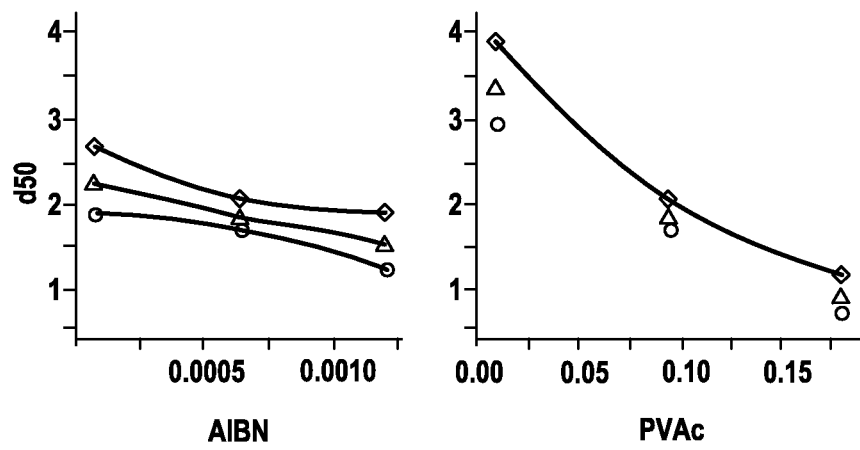

Fig. 23
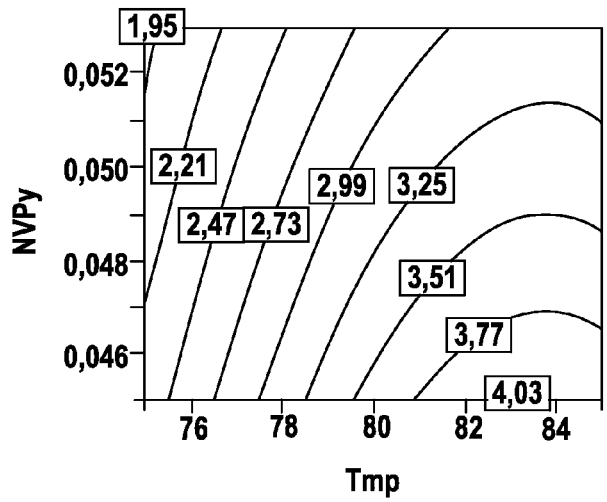
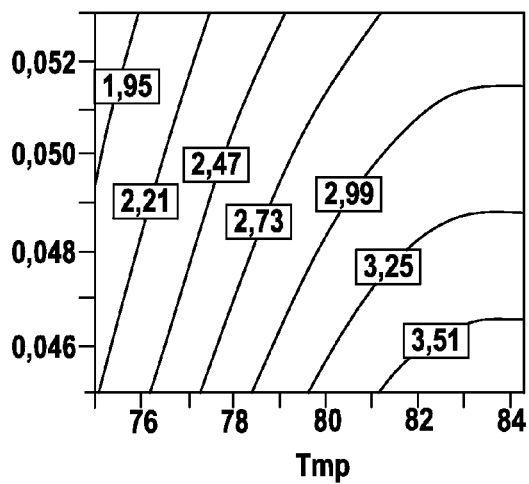
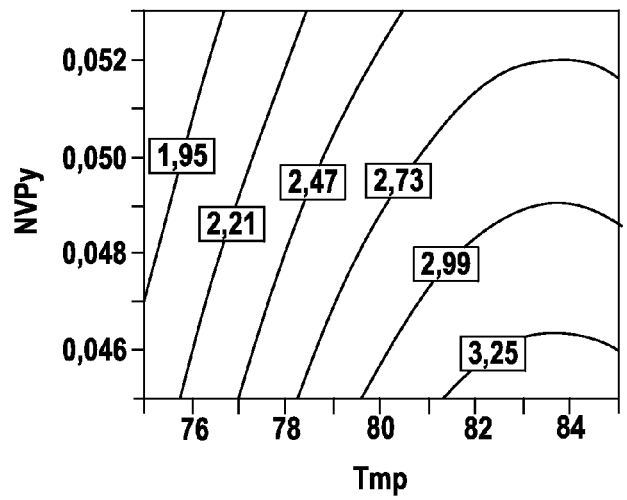

Fig. 27
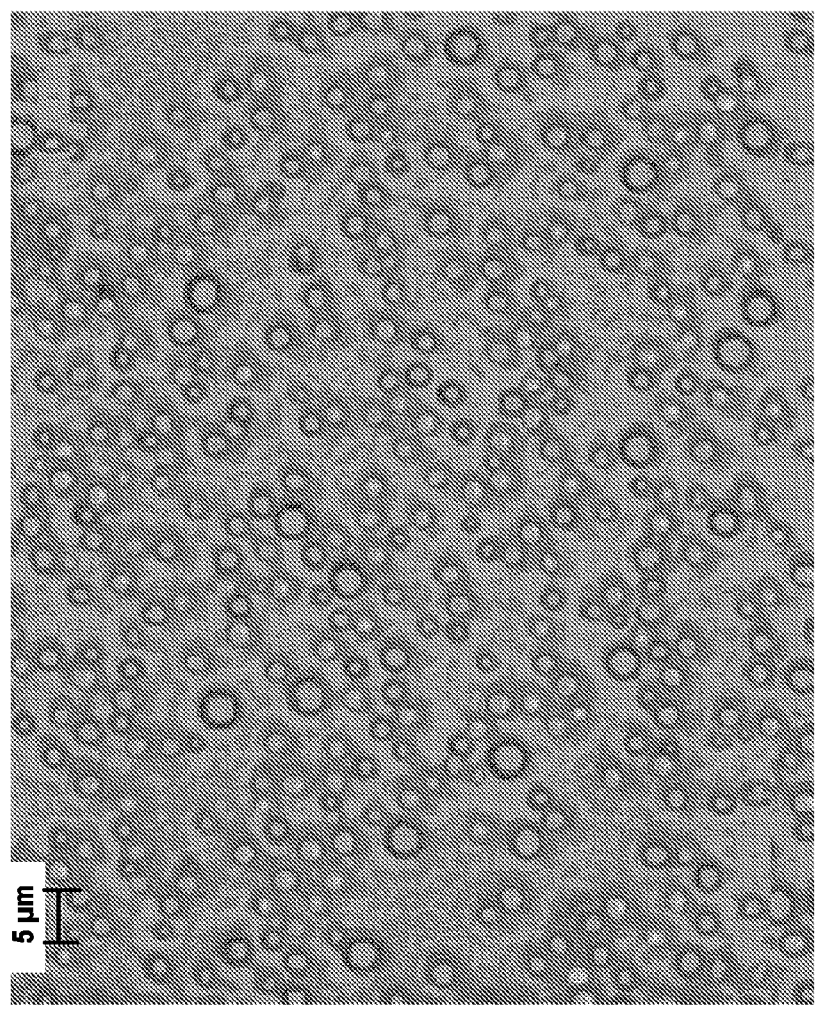
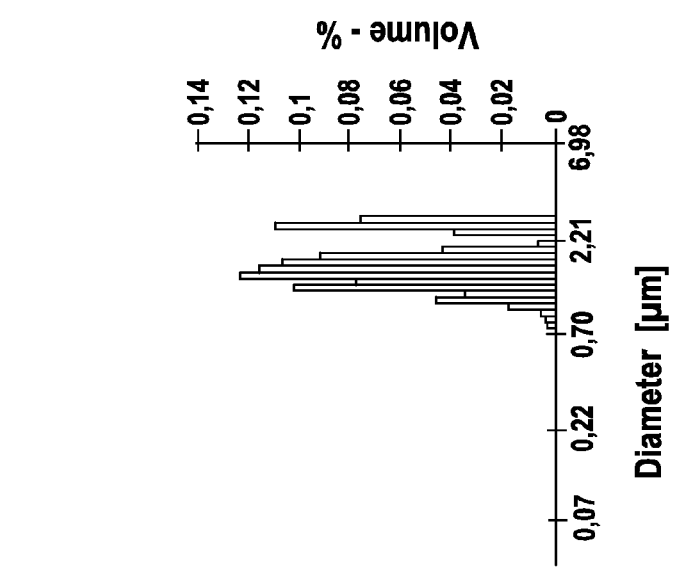

Fig. 31
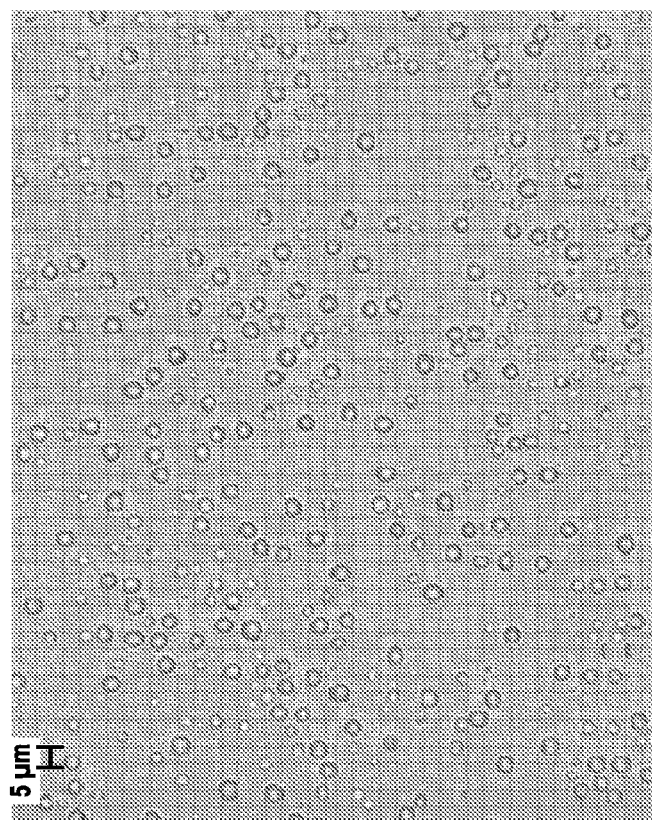
b)
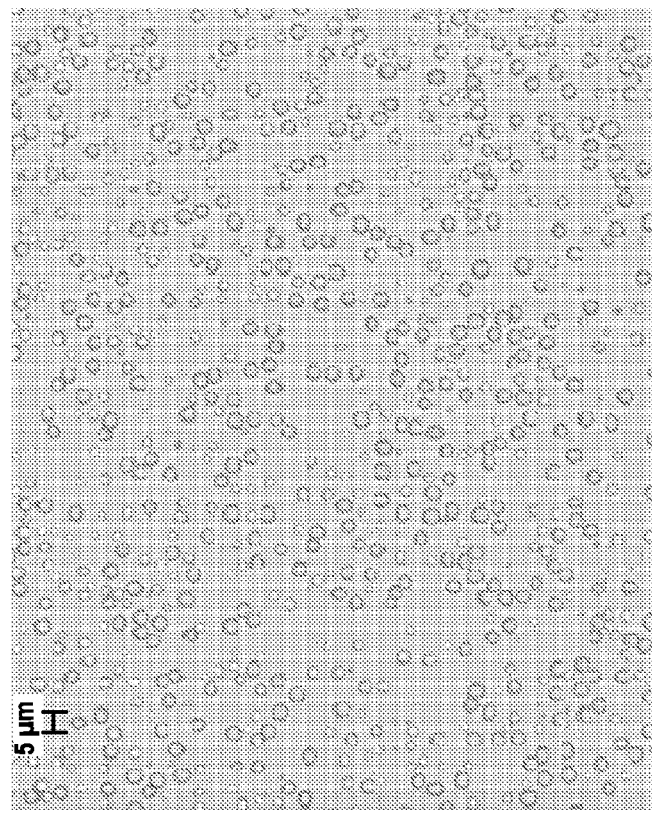
a)

Fig. 37
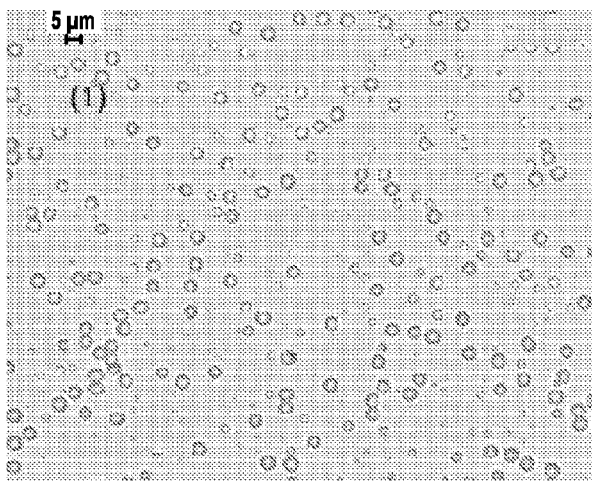
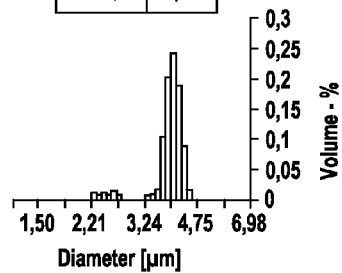
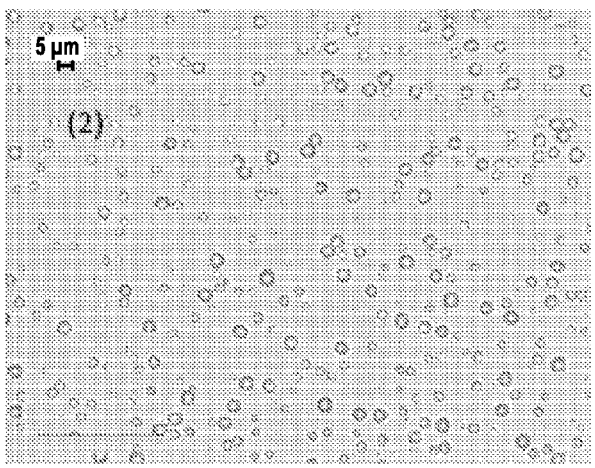
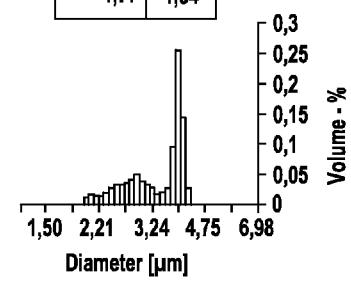
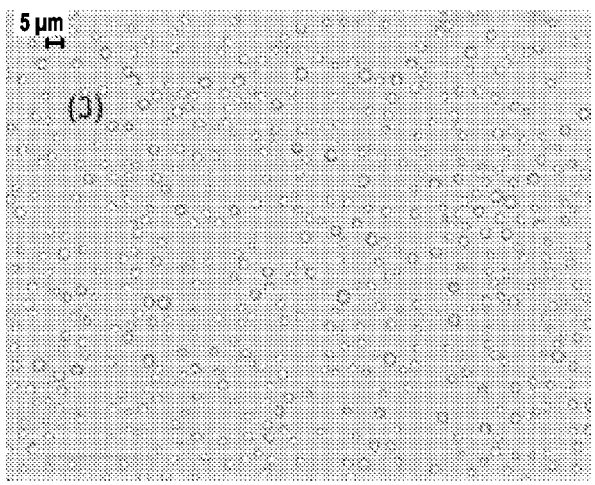
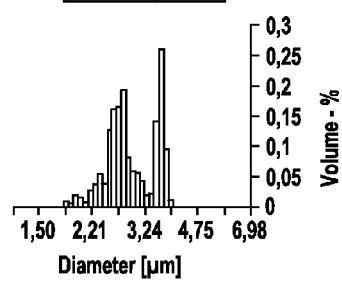

METHOD FOR PRODUCING HYDROPHILIC POLY-N-VINYLPYRROLIDONE AND USE THEREOF

The present invention relates to a novel process for the production of spherical poly-N-vinylpyrrolidone particles which have a very narrow particle size distribution, and to the use thereof.

Liquid chromatography is increasingly attracting interest in chemistry and biochemistry as a method for the preparation, separation and analysis of biomolecules, in particular proteins. Materials based on organic polymers have proven very suitable for the stationary phase here. Their high chemical stability enables use under conditions under which the alternative silica gels cannot be used [1].

For the economic efficiency of a preparative chromatography process, optimum separation efficiency with the highest possible throughput and at the same time low operating pressure is necessary. The crucial factors for this are the particle size, the sphericity and the monodispersity of the packing material. If the latter consists of non-round, very small or differently sized particles, irregular compaction within the column may occur, adversely affecting the separation efficiency, the pressure/flow behaviour and the reproducibility.

However, monodisperse, macroporous polymer particles were in the past only accessible up to a maximum size of 2 μm [2].

Starting from the developments by J. Ugelstad ("two step swelling process") and J. W. Vanderhoff ("successive seeding method"), it has in the meantime become possible to grow seed particles of small size by a multiple of their volume by a swelling process without losing the monodispersity [23-28]. The production of the seed particles is carried out by dispersion polymerisation and is described in detail in the literature for polystyrene and occasionally for other polymers [12, 13, 14, 18, 21].

In the isolation and purification of proteins, the fact that each biomolecule undergoes a specific, adsorptive interaction with the surface of the chromatography material is utilised. With the aid of seed polymerisation, it is now possible, starting from the seed polymer as supporting framework, to construct a particle sheath having a surface adapted to the objective. This is achieved by the use of certain monomers during the growth and/or surface modification, so that immobilisation of the desired protein on the particle surface by means of functional groups is ensured [1,2,5,6,7,8]. For the preparation of proteins, the support material used is preferably hydrophilic matrices, since proteins undergo non-specific interactions with hydrophobic regions of the particle surface, which has an adverse effect on the separation efficiency [1,3-6].

It is known to prepare polyvinylpyrrolidone by free-radical polymerisation of N-vinylpyrrolidone.

In a first step, the decomposition, usually thermal, of initiators, such as azo compounds or peroxides, results in the formation of free radicals. These react with a vinylpyrrolidone molecule to give a new free radical (chain initiation).

During chain growth, further monomer units are added on, so that macroradicals gradually form. The chain growth is terminated when two free radicals combine or disproportionate (chain termination) [31].

FIG. 1 shows the reaction steps in the free-radical polymerisation of vinylpyrrolidone.

Dispersion polymerisation is a special case of precipitation polymerisation. At the beginning of the reaction, the monomer, the initiator and the stabiliser or dispersant are in homogeneous solution. During the reaction, a stable dispersion forms, with the polymer produced in the discontinuous phase and the solvent in the continuous phase. A characteristic of the reaction medium is its good dissolution capacity for the monomer, initiator and stabiliser, while the polymer formed precipitates out from a critical molecular weight. The crucial properties of the stabiliser are its polymer-affinitive and solvent-affinitive segments, meaning that it is adsorbed by the surface of the resultant polymer particle by means of the polymer-affinitive part and coagulation and melting of the particles is prevented via steric effects. The steric stabiliser used is usually a polymer or copolymer. The stabilising action is dependent, inter alia, on its molecular weight and its solubility in the reaction medium.

FIG. 2 shows diagrammatically the principle of action of the steric stabilisation (from: Mini-Encyclopaedia of Papermaking Wet-End Chemistry).

In order to influence the solubility of the resultant polymer, use is also made of co-stabilisers for changing the polarity of the solvent or of crosslinking substances [11-22, 38].

The size, size distribution, average molecular weight and sphericity of the final particles are influenced by numerous parameter settings. In the literature, various authors have reported on the effects of the type and concentration of the monomer, initiator and stabiliser, and of changes in the reaction temperature and the polarity of the solvent.

Some of them describe, based on empirical data, a mechanistic model for the formation and development of the polymer particles in dispersion polymerisation under varying reaction conditions and with a modified composition of the components. The course of dispersion polymerisation is divided into three successive phases:

initiation of the polymerisation and chain growth in the continuous phase formation of the particles growth phase of the particles The initiation is caused by thermal decomposition of the initiator molecule to form two free radicals. The reaction initially proceeds in solution at the stage of chain growth in free-radical polymerisation until a critical molecular weight is reached, and the polymer precipitates out. During the formation phase, the oligomers which have precipitated out agglomerate to form unstable particles and at the same time adsorb stabiliser molecules. This process continues until sufficient stabiliser molecules have been adsorbed, meaning that stable nuclei particles have formed, which are protected against further coagulation.

In the growth phase, the nuclei absorb monomers, oligomer-free radicals and dead polymer (chain termination) from the continuous phase, and consequently the further polymerisation from this time takes place principally within the discontinuous phase.

FIG. 3 shows the course of the formation and development of polymer particles during dispersion polymerisation for the example of the polymerisation of styrene with a functional macromer as stabiliser [14].

In accordance with this model idea, the formation phase is crucial for the production of monodisperse polymer particles. This stage of the reaction must be complete within a short time interval for a high degree of monodispersity. It is described that the final particle count is defined within the first 20 minutes or after 2%-5% conversion [11, 13]. In the polymerisation of methyl methacrylate, K. E. J. Barrett determines the time of completion of particle formation at a conversion of less than 1% [22]. The reaction conditions should accordingly be selected in such a way that the oligomers growing at a later time are absorbed by the nuclei before they can themselves be stabilised in the process of agglomerative nucleation.

The particle size is also crucially determined during the formation phase. The crucial factor for the progress of the polymerisation, before precipitation and thus the formation of nuclei occurs, is the solubility of the resultant polymer in the reaction medium. The critical molecular weight, the rate of free-radical formation and chain growth, and the ratio between the coagulation rate and the stabilisation rate during nucleation are important factors for the size of the resultant particles [11-21].

With the aid of seed polymerisation, it is possible to grow polymer particles in the micron range by a multiple of the original size by special swelling processes (see FIG. 4). A growth sequence in seed polymerisation is depicted by way of example in FIG. 4.

During the swelling, seed polymer-affinitive components (specific monomers, crosslinking agents, initiator, pore former) which are sparingly soluble or insoluble in the ambient medium are fed to the seed particle dispersion. This is usually carried out by means of finely dispersed emulsions, so that the swelling component can be absorbed uniformly by the particles. The swollen, gelatinous particles can subsequently be polymerised out, giving stable, porous polymer particles. Monodisperse seed particles approximately retain their size distribution during growth using this method. The literature has in the meantime described a range of seed polymerisation techniques, inter alia "two step swelling method" [35], "successive seeded method" [36], "seeded emulsion polymerisation" [37] and "dynamic swelling method" [32].

OBJECT

The aim of the present work is thus to provide a novel process for the polymerisation of N-vinylpyrrolidone. In particular, the object consists in providing a process which is simple to carry out, giving corresponding polymer particles having high monodispersity, pronounced sphericity and optimised size distribution of the particles. It is furthermore an aim of the present work to provide a quantitative method for the production of the desired particles which is inexpensive to carry out and which both can be carried out on a semi-industrial scale and also results in polyvinylpyrrolidone seed particles which can be employed in further reactions and at the same time have advantageous properties, making them particularly suitable for use in chromatographic separation methods.

DESCRIPTION OF THE PRESENT INVENTION

On the basis of the series of experiments which have been carried out, a process has been found for the production of the largest possible spherical, monodisperse polyvinylpyrrolidone (PVP) seed particles in the micron range by dispersion polymerisation. The particles obtained by this process represent the starting materials for the production of macroporous polymer particles, which can in turn be employed in preparative and analytical chromatography for protein preparation. They can be employed both as base material and also for further reactions.

The present invention relates to a process for the production of polymer particles having high monodispersity and pronounced sphericity, characterised in that N-vinylpyrrolidone is polymerised in the presence of a solvent selected from the group ethanol, isopropanol and dioxane, or a mixture of these solvents and optionally in a mixture with water, and the polyvinylpyrrolidone formed is precipitated from the dispersion in the form of polymer particles.

This polymerisation process can be carried out in the presence of seed particles. The polymerisation can be carried out using a crosslinking agent in a concentration of 0.5 to 2.5% by weight, preferably 1 to 2% by weight. As solvent, ethanol and/or isopropanol can be added to the reaction solution in an amount of 0.5 to 10% by weight, preferably in an amount of 5% by weight. In particular, however, dioxane can also be employed as solvent, more precisely in a concentration of 1 to 11% by weight, preferably 1 to 3% by weight and particularly preferably in a concentration of 5 to 10% by weight. The solvent is preferably used in the reaction solution in a mixture with water. Furthermore, the polymerisation can be carried out in the presence of a stabiliser, which can be employed in a concentration of 0.8 to 18% by weight. The stabiliser is preferably employed in a concentration of 2.5 to 10% by weight and particularly preferably in a concentration of 6 to 10% by weight. A stabiliser of this type may be polyvinyl acetate. In order to carry out the polymerisation, seed particles may be present in the reaction mixture. An added initiator may be present in the reaction mixture in an amount of 0.2 to 5% by weight, preferably 0.5 to 4% by weight, particularly preferably in an amount of 1% by weight. The polymerisation experiments have shown that azobisisobutyronitrile [AIBN] is particularly suitable for this purpose.

Particularly good polymerisation results are achieved if the process is carried out at a temperature in the range from 60 to 90° C., preferably in a range from 75 to 90° C.

Swelling of seed particles enables particles having advantageous properties to be obtained by the process according to the invention. If desired, polymer particles having certain size distributions and properties can be obtained by the process according to the invention, making the polymer particles particularly suitable for use for chromatographic separation methods.

The present invention also relates to a process for the production of the largest possible spherical, monodisperse polyvinylpyrrolidone (PVP) seed particles in the micron range by dispersion polymerisation. The particles obtained in this way represent the starting materials for the production of macroporous polymer particles, which can in turn be employed in preparative and analytical chromatography for protein preparation. However, they can also be employed as base material for further reactions.

The present invention thus also relates to a quantitative method for the production of the desired particles which is inexpensive to carry out, can be carried out on a semi-industrial scale and results in polyvinylpyrrolidone seed particles which can be employed in further reactions and have advantageous, in particular improved, properties for use in chromatographic separation methods.

The present application also relates to the production of polyvinylpyrrolidone particles using monodisperse seed particles which have a strongly hydrophilic character. The problem of non-specific interactions between proteins and support materials in the chromatography is thereby minimised.

The present invention also relates, in particular, to polymer particles having high monodispersity and pronounced sphericity, having average particle diameters in the range from <1 µm to 5 µm and a polydispersity index of PDI <1.1, which are obtained by the described process according to the invention.

DETAILED DESCRIPTION OF THE INVENTION

With the aid of the novel method according to the invention, it is possible to produce PVP particles having average particle diameters in the range from <1 µm to ~5 µm by dispersion polymerisation. The experiments carried out for development of the method have resulted in the discovery of the principal influencing quantities on the particle properties, meaning that products having desired particle sizes and size distributions can be produced specifically by the present process according to the invention. The process found can advantageously be carried out reproducibly, especially as it can preferably be carried out in an automatic synthesiser. As a consequence, reactor-specific variations in the particle size and size distribution are very small and attributable to differences in the temperature management in the individual reactors.

The particles produced by the process according to the invention have substantially bimodal size distributions, exhibiting a high degree of monodispersity with a PDI <1.1 [PDI=polydispersity index]. {In the literature, particle size distributions having PDI values <1.05 are regarded as monodisperse [11]}.

During the reaction, NVP is converted into PVP, so that the stabilisation rate increases and smaller particles are thus generated with the lower solubility of the PVP. Experiments for recording the time development of the size distribution during the reaction have been carried out. These investigations were carried out with a different initiator concentration and show that the bimodality occurs as a function of the conversion of the monomer.

It has been found that particular attention must be paid to the choice of solvent for carrying out the process according to the invention, since the PVP particles exhibit different swelling behaviour in the various solvents in the presence of different swelling agents. Thus, different solvents compete with the particles in taking up the swelling agents.

Polyvinylpyrrolidone seed particles represent an attractive alternative to the existing seed particles for the production of macroporous polymer particles as chromatography material for protein preparation owing to their hydrophilicity. The present experiments have now enabled the development of a process which enables the production of particles having a diameter of >4 μm having relatively narrow size distributions. The experiments carried out have shown that even the use of different reactors has an effect on the morphology of the particles obtained, and a specific choice of a suitable reactor produces particles having the desired properties.

It has furthermore been found that, on use of PVP seed particles for the preparation of chromatography materials having advantageous bimodal size distributions, the swelling behaviour of these seed particles should be taken into account in particular if crosslinking agent concentrations >2% are employed. This is of particular importance in scale-up batches on a semi-industrial or industrial scale.

On the basis of the known methods described above, series of experiments on the basis of statistical experiment planning, also known as Design of Experiments (DoE), have been carried out in order to ensure an optimum ratio between the number of individual experiments and the information content of the results.

For this purpose, a drawn-up experiment plan was executed. Owing to the small number of experiments, each individual experiment in the statistical experiment planning represents an important point in a mathematical model. Thus, chance or systematic influences can be taken into account in the evaluation. After execution of the experiment plan, the experimental results are analysed and interpreted. Accordingly, qualitative or quantitative conclusions on the influences of parameters for the system investigated are possible after evaluation of a DoE of this type.

FIG. 5 shows for illustration the phases in the use of a DoE (Design of Experiments) [29].

The list of individual experiments to be carried out and the mathematical calculations are carried out in the DoE with the aid of special software. Thus, the focus therein is to define possible influencing or interfering quantities, the process parameters to be varied and the target quantities in advance.

In simplified terms, this can be depicted in an illustrative manner, as shown in FIG. 6, as an "input/output model" of a process or system [29].

The number of individual experiments necessary is essentially dependent, apart from on the number of factors, on whether linear, quadratic or interaction terms should be taken into account for the adapted mathematical model. Further experiments are necessary with the inclusion of each term. For the design of the experiment plan, it must be determined which terms must be present for an adequate description of the system. It is therefore necessary to allow previous theoretical knowledge from the corresponding literature and experience values to flow into the experiment plan in order to minimise the number of individual experiments.

A random sequence of the experiments compensates for possible interferences arising from influences which change over time (see FIG. 7) [29]. FIG. 7 depicts the influence of time-dependent interferences for the example of instrument drift and shows the advantage of a randomised experiment plan.

Screening experiment plans are particularly suitable if little is initially known about a problem. At the beginning of the development of a product or process, as many factors as possible should firstly be investigated for their significance and the direction of their influence on the target quantities. When optimising processes or products, only a few influencing quantities are then varied with respect to one another.

In the experiment plan drawn up, each individual experiment represents a point in a multidimensional space. FIG. 8 depicts this experiment space for two (left) and three (right) factors [29]. In order to investigate linear effects, the factors only adopt values on the corner points of the square or cube. In order also to be able to reproduce quadratic correlations, additional points are added in the centre and on the sides or surfaces. In FIG. 8, these points are placed outside the experiment space, which is also possible. However, they would leave the defined value range.

Each point in this space can be assigned a value for the target quantity after the experiments have been carried out. The spatial arrangement then enables a prediction of the target quantity within the experiment space investigated, depending on the choice of model. The terms shown in Table 1 are used for this purpose.

TABLE 1

| Linear, quadratic and interaction terms for two and three factors [29] | | | |
|---|---|---|---|
| | Linear model | Interaction model | Quadratic model |
| Two factors | $Y = b_0 + b_A x_A + b_B x_B$ | $\ldots + b_{AB} x_A x_B$ | $\ldots + b_{AA} x_A^2 + b_{BB} x_B^2$ |
| Three factors | $Y = b_0 + b_A x_A + b_B x_B + b_C x_C$ | $\ldots + b_{AB} x_A x_B + b_{AC} x_A x_C + b_{BC} x_B x_C$ | $\ldots + b_{AA} x_A^2 + b_{BB} x_B^2 + b_{CC} x_C^2$ |

The coefficients (b0, bA, . . . ) of the terms used from Table 1 are determined by regression analysis with the aid of the experimentally determined values of the target quantities.

After the regression, the adapted model is tested for accuracy and suitability. Whether it is a suitable model is determined by the graphic assessment of the residues. The residues (deviation $y_i - \hat{y}$ of the measurement values from the values predicted by the adapted model) are checked for normal distribution by plotting in a probability network. In addition, outlier experiments can determined in this way.

For assessment of the model accuracy, the measured values are plotted against the predicted values. In the case of ideal model accuracy, the points would lie on the bisector. The model is described quantitatively by the correlation coefficient, which, indicates how far the measurement points are away from the bisector [30].

The following chemicals are used for carrying out the experiments of the experiment plan:
1-Vinyl-2-pyrrolidone (stabilised with N,N'-di-sec-butyl-1, 4-phenylenediamine),
    manufacturer: Merck Schuchardt OHG, Article Number: 8.08518
n-Propyl propionate,
    manufacturer: Dow Chemical Company
Ethyl acetate,
    manufacturer: Merck KGaA, Article Number: 1.09623
Methyl ethyl ketone,
    manufacturer: Merck KGaA, Article Number: 1.06014
Ethanol,
    manufacturer: Merck KGaA, Article Number: 1.11727
1,4-Dioxane,
    manufacturer: Merck KGaA, Article Number: 1.03115
α,α'-Azoisobutyronitrile,
    manufacturer: Merck-Schuchardt, Article Number: 8.01595
Polyvinyl methyl ether, solv. 50% in water, MW ~50,000,
    manufacturer: Polysciences, Inc., Article Number: 07903032-500 (supplier company: tebu-bio)
Polyacrylic acid (product name: Carbopol® 934),
    manufacturer: SERVA Electrophoresis, Article Number: 15885.01
Polyvinyl alcohol 40-88,
    manufacturer: Merck KGaA, Article Number: 1.41353
Polyvinyl acetate, MW ~50,000,
    manufacturer: Alfa Aesar, Article Number: A12732
Polyvinyl acetate, MW ~140,000,
    manufacturer: Sigma-Aldrich, Article Number: 387924
Polyvinyl acetate, MW ~500,000,
    manufacturer: Sigma-Aldrich, Article Number: 387932
DVC (N,N-divinylethyleneurea, BASF, Ludwigshafen)

The performance itself is carried out using the following equipment:
Multiplant M100, automatic synthesiser
Manufacturer: Chemspeed Technologies AG
Software: Application Editor/Application Executer Version 1.9.2.24
Leica DM 2500M, light microscope
Camera: Leica DFC 280
Software: Leica Application Suite Version 3.3.1 (incl. licence for LAS Interactive Measurement Module)
MODDE 8, software for statistical experiment planning
Manufacturer: Umetrics
Eppendorf Centrifuge 5804
Max. loading: 8×40 ml; max. speed: 5000 rpm
    Further details on the performance of the experiment plan:
    Since quite a lot of individual experiments had to be carried out, the actual experiment plan was executed using the smallest possible amounts of substances in order to save costs and materials. These experiments were subsequently scaled up to larger plants and therefore had to run under defined conditions which can be applied to an industrial scale.

The experiments were carried out using the Multiplant M100 developed by Chemspeed Technologies. Up to six stirred reactors operated batchwise with a maximum capacity of 70 ml can be controlled simultaneously in this plant under defined reaction conditions.

FIG. 9 depicts a simplified flow chart of the functioning and equipment of the Multiplant M100.

The following functions and elements were used for process control for the dispersion polymerisation experiments:

With the aid of the "Application Editor" as software, the process control for each individual reactor can be programmed. The setting of the vacuum and nitrogen valves, the reactor temperature, the temperature rate in heating or cooling phases, the stirrer speed and the operating duration for each state can be defined using this program.

Using the "Application Executer", the programmed applications are in turn carried out. The actual and target values of the process parameters can be visualised in tabular form or as a real-time curve and corrected by the user during operation. The change in the parameters with time is recorded in a log file.

The reactor interior is fitted with a Pt100 thermocouple, whose signal is transmitted to the control unit via a patch cord. The dynamic behaviour of the controlled system can be optimised in the software configuration by modifying the PID parameters for the system.

The stainless-steel reactors are surrounded by a stainless-steel jacket, whose temperature is likewise recorded by a Pt100 thermocouple and regulated by the control of a cooling-water circuit and heating rods. FIG. 10 shows a plan view of the function principle of jacket temperature control.

For temperature control, the cooling water flows through the jacket space and the reactor head. The water is cooled via a heat exchanger, with the heat exchange taking place with a silicone-based oil (HTF 190 oil). This oil is kept constantly at the desired temperature by a cryostat (Huber-Unistat) with the aid of a circulating pump.

The reduced pressure generated by the vacuum pump (Vacuubrand cvc 200 II) is applied to each individual reactor by changing the position of the main valve and the 3-way valves. The same applies to the nitrogen feed, where the pressure is adjusted with the aid of a float-type flow meter.

For mixing, the reactor used in each case has a magnetic stirrer. The stirrer shaft of the stirrer does not come into direct contact, but instead magnetically, with the drive. The magnet is moved by a gearwheel system, enabling the stirrer speed and energy expenditure to be measured and regulated.

In order to carry out the experiment, a stabiliser stock solution is prepared by weighing out the polymer and solvent into a conical flask and homogenising the mixture at room temperature using a magnetic stirrer.

For each reactor, the individual components of the reaction mixture are weighed out directly into a 25 ml conical flask.

Firstly, the initiator and the crosslinking agent are dissolved in NVP. The stabiliser solution and the remainder of the solvent are subsequently metered in. The reaction mixture is homogenised by shaking until streaks are no longer visible, before it is transferred into the cleaned, dry reactors.

The reactors are placed in the miniplant and in each case connected to the cooling-water circuit, temperature sensor and stirrer.

In the "Application Editor", an application is programmed by means of which the process management for the individual reactors is defined. Before the application is started, the vacuum pump and the cryostat are switched on, and the nitrogen feed is adjusted to about 1 bar. Each performance of the experiment starts with an inertisation process, in which nitrogen and vacuum are alternately applied to the reactors.

Before optimisation of the process of the dispersion polymerisation of NVP, various components were tested for suitability in preliminary experiments. While the choice of initiator and crosslinking agent falls on substances usually employed, qualitative information on the functionality of the solvents and stabilisers investigated is provided in these preliminary experiments. In addition, limits for the concentration of the components are tested for carrying out this screening in order to ensure the technical feasibility of the experiments.

Azo compounds, in particular azobisisobutyronitrile (AIBN), are described in the literature as preferred initiators for the production of monodisperse polymer particles by dispersion polymerisation. The range between 50° C. and 80° C. is recommended in the literature as a suitable polymerisation temperature on use of AIBN. In systems described in the literature, AIBN is employed in an amount in the range 0.5%-4.0%, based on the concentration of the NVP [11-22].

The reduction in the solubility of the polymer formed in the reaction medium or in solvents for further process steps is achieved by the crosslinking of the linear polymer chains. To this end, a divinyl compound is used here. The crosslinking agent is integrated randomly into the polyvinylpyrrolidone chains and branches the molecule through a further chain initiation at the second reactive vinyl group. The amount of divinyl crosslinking agent is indicated in parts by weight, based on the concentration of the NVP. During metering, it must be taken into account that strongly crosslinked seed particles also have poor swelling properties besides insolubility.

In dispersion polymerisation, the choice of solvent plays an important role. The suitable solvent is characterised by the precipitating action onto the polymer formed, where the monomer, the initiator and the stabiliser must be readily soluble.

Solvents which are suitable as solvents or as precipitants for PVP are shown in Table 2:

TABLE 2

Solvents and precipitants for polyvinylpyrrolidone from the product description of BASF Luvitec ® K products from [31]

Soluble in

| | | | |
|---|---|---|---|
| formic acid | dimethylacetamide | isopropanol | propylene glycol |
| 1,4-butanediol | dimethyl sulfoxide | methanol | pyrrolidone |
| butanol | acetic acid | methylene chloride | triethanolamine |
| butylamine | ethanol | methylcyclohexanone | vinylpyrrolidone |
| chloroform | ethylene diamine | n-methylpyrrolidone | water |
| cyclohexanol | ethylene glycol | polyethylene glycol 400 | |
| diethylene glycol | glycerol | propanol | |

Insoluble in

| | | | |
|---|---|---|---|
| acetone | diethyl ether | methyl acetate | carbon tetrachloride |
| butane | dimethyl ether | methyl ethyl ketone | tetrahydrofuran |
| cyclohexane | dioxane | mineral oil | toluene |
| cyclohexanone | ethyl acetate | petroleum ether | xylene |
| chlorobenzene | hexane | propane | |

During the polymerisation, the boiling point of the solvent must not be exceeded. It is described in the literature that the ideal temperature range in the case of the initiator used is in a range between 50° C. and 80° C. When selecting the solvent, it must be ensured that the possibility of varying the reaction temperature in the said range is not excessively restricted by its boiling point.

Owing to the toxicity, accessibility and general handling, the use of the solvents shown in Table 3 is particularly preferred.

TABLE 3

Solubilities of the particularly suitable solvents

| Solvent | Boiling point [° C.] | Solubility of vinylpyrrolidone | Solubility of Kollidon K30 (PVP) |
|---|---|---|---|
| 1,4-Dioxane | 101 | readily soluble | sparingly soluble |
| Methyl ethyl ketone | 80 | readily soluble | soluble |
| Ethyl acetate | 77 | readily soluble | insoluble |
| Propyl propionate | 123 | readily soluble | insoluble |

By means of the experiments, it has been found that advantageous polymerisation results are also obtained in the present system with the selected initiator at temperatures higher than 80° C., in particular up to 85° C. or higher.

Experiments on the dispersion polymerisation of NVP have been carried out with the solvents from Table 3 with 2-15% of monomer, 0.5-2.0% of AIBN and 0-2.5% of divinyl crosslinking agent.

By means of the experiments, it has been found that a pure solution polymerisation takes place in the presence of 1,4-dioxane and methyl ethyl ketone without a crosslinking agent. In the case of 1% or higher crosslinking, the polymer precipitates out as a clear, homogeneous gel.

In the presence of ethyl acetate and propyl propionate, the polymer precipitates out as a white solid. Agglomerates consisting of PVP which has precipitated out in particulate form are evident under the light microscope. In order to form particles and prevent agglomeration, various stabilisers can be added. In this connection, systems comprising polyacrylic acid (PAA), polyvinyl methyl ether (PVME) and polyvinyl acetate (PVAc), inter alia, are known from the literature as stabilisers [7, 13, 20, 24, 25, 32, 34].

In the experiments carried out, firstly the steric stabilisers were investigated for their solubility in the solvents used. PVME is only available as a 50% aqueous solution and is firstly dried at 50° C. for 48 h.

TABLE 4

Solubilities of the steric stabilisers

| Solvent | PAA | PVME MW ~50,000 | PVAc MW ~50,000 | PVAc MW ~140,000 | PVAc MW ~500,000 |
|---|---|---|---|---|---|
| 1,4-Dioxane | insoluble | soluble | soluble | soluble | soluble |
| Methyl ethyl ketone | insoluble | soluble | soluble | soluble | soluble |

TABLE 4-continued

Solubilities of the steric stabilisers

| Solvent | PAA | PVME MW ~50,000 | PVAc MW ~50,000 | PVAc MW ~140,000 | PVAc MW ~500,000 |
|---|---|---|---|---|---|
| Ethyl acetate | insoluble | >10% | >20% | >10% | >10% |
| Propyl propionate | insoluble | >10% | >20% | >10% | >10% |

Owing to the solubility of the stabilisers considered and the results of the first polymerisation experiments, experiments were also carried out with ethyl acetate and propyl propionate as solvents and PVME and PVAc as steric stabilisers. Qualitative criteria for the suitability of the systems are regarded as being the sphericity, the size and the degree of isolation of the particles formed.

PVME and PVAc having 140 k g/mol and 500 k g/mol as average molecular weight (MW) exhibit a significantly greater stabilising action than PVAc having MW 50 k g/mol. The advantage here is that a low concentration (<1%, based on the batch as a whole) is sufficient for these stabilisers in order to avoid agglomeration and caking at relatively high monomer concentrations (up to 20%). However, the particles produced are either not round or have an average particle diameter ($d_{50}$) of <1 µm for varied compositions of the reaction mixture.

In experiments with PVAc, MW 50 k g/mol, in propyl propionate as solvent/stabiliser system, spherical particles having a size of up to 5 µm were found whose size distribution can be significantly influenced by changes in the composition of the reaction mixture. The stabilising action is comparatively small, meaning that only high stabiliser concentrations (>12%) enable the production of isolated particles with monomer concentrations of above 6%. In ethyl acetate, round particles cannot be produced (see FIG. 11). FIG. 11 shows photomicrographs of PVP particles. These photographs are characteristic of the systems with PVME, PVAc MW 140 k, PVAc MW 500 k, PVAc MW 50 k as stabiliser in propyl propionate (B-E) and in ethyl acetate (A).

The following table summarises the results of the experiments by means of which it was possible to determine suitable solvents and stabilisers for dispersion polymerisation.

TABLE 5

Action of various solvents and stabilisers on
particle formation and precipitation thereof.

Experimental results

Solvent

| 1,4-Dioxane | PVP does not precipitate out in participate form |
| Methyl ethyl ketone | PVP does not precipitate out in particulate form |
| Ethyl acetate | Precipitation of isolated, non-spherical PVP particles |
| Propyl propionate | Precipitation of isolated, spherical PVP particles possible with corresponding stabiliser |

Stabiliser

| PVME | Strong stabilising action; particles produced are too small and in some cases not round |
| PVAc, MW 50k | Comparatively small stabilising action; production of spherical particles in the target size order is possible |
| PVAc, MW 140k | Strong stabilising action; particles produced are too small and in some cases not round |
| PVAc, MW 500k | Strong stabilising action; particles produced are too small and in some cases not round |

On the basis of the results of the experiments carried out, the components shown in Table 6 have proven suitable for the dispersion polymerisation of N-vinylpyrrolidone:

TABLE 6

Components of the system investigated

| Function | Chemical compound | Data in percent by weight (wt %), based on |
|---|---|---|
| Monomer | N-Vinylpyrrolidone (NVP) | batch as a whole |
| Initiator | Azobisisobutyronitrile (AIBN) | monomer |
| Crosslinking agent | Divinyl compound (DVC) | monomer |
| Stabiliser | Polyvinyl acetate, MW ~50,000 (PVAc) | batch as a whole |
| Solvent | Propyl propionate (PP) | — |

In order to determine the most optimum conditions for the production of monodisperse, spherical PVP particles having the greatest possible average particle size, the influences of the experimental parameters were investigated with the aid of a DoE.

By means of preliminary experiments, limits for the requisite concentrations of AIBN, PVAc and NVP were set.

It was found that the minimum value of the PVAc concentration must be increased greatly in the ratio in the system investigated in the case of a small increase in the concentration of NVP in order to prevent caking, melting and agglomeration. A separate value range for the concentration of PVAc was therefore assigned to each NVP level for the first experiment plan in order to be able to investigate the greatest possible parameter variance.

These experiments gave rise to the limits for the individual parameters shown in Table 7.

TABLE 7

Parameter ranges for the first experiment plan

Varying parameters

| [NVP] | | 3%-6% |
| [PVAc] | at 3-4% of NVP | 0.8%-5% |
| | at 5% of NVP | 5%-12% |
| | at 6% of NVP | 12%-18% |
| [AIBN] | | 0.5%-2.0% |
| Reaction temperature | | 62° C.-78° C. |

Fixed parameters

| [DVC] | 1.5% |
| Temperature rate | 1° C./min |
| Stirrer speed | 200 rpm |
| Reaction time (incl. heating phase) | 16 h |

In general, it is known regarding the influence of the crosslinking agent content that particles having an increasing degree of crosslinking have a lower swelling potential and thus precipitate out smaller. In addition, the polymerisation with divinyl monomers usually proceeds in a more uncontrolled manner, which, in the case of high concentrations (>0.5%), may result in broader size distributions and non-round particles and in agglomeration [16, 21]. Our own experiments have shown that a content of about 1.5% of DVC ensures adequate stability of the PVP particles in the aqueous phase and agglomerations do not occur in the selected compositions.

Since the experiments have shown that no significant differences arise in the experimental results at temperature rates in the range from 0.3° C./min to 3° C./min, the temperature rate was set at 1° C./min for all further experiments, inter alia because this value is readily transferable to large-scale industrial plants.

In addition, it has been found that changes in the stirrer speed between 100 rpm and 600 rpm with a paddle stirrer ($d_{stirrer}=1.5$ cm, $d_{reactor}=4.2$ cm) do not cause any significant differences in the results with otherwise constant experimental parameters.

Furthermore, the experiments have shown that changes in the representation of the particles can no longer be perceived after an experimental duration of 16 h.

For evaluation of the DoE, the target quantities for each experiment must adopt a value via the significant change in which the influences of the individual parameters are determined.

The PVP particles are characterised by their sphericity, average particle size and monodispersity with the aid of light photomicrographs. Since predominantly round particles are obtained under the conditions set, the sphericity is initially disregarded in the evaluation and only described by subjectively determined scores of 1-3.

The average particle size ($d_{50}$) and the monodispersity ($d_{90}/d_{10}$) are determined via the volume-% distribution. For the measurement, the batch is firstly homogenised in order to be able to take a representative sample using the pipette. When it has been ensured that the sample is uniformly distributed on the specimen slide, a random image section is selected for the photograph. With the aid of the measurement software, the particles on the image section (about 300-500 units) are measured.

Starting from the diameters of the particles, the volume thereof is calculated:

$$V = \frac{1}{6} \cdot \pi \cdot d^3.$$

In order to obtain a curve with the greatest possible normal distribution, the x axis of the distribution diagram is logarithmically scaled. In Microsoft Excel, categories having lg value intervals of equal size are set up, and the number of particles whose volume gives a corresponding lg value is assigned to each category. Thus, $$V_{total} = \Sigma n_i \cdot V_i$$

gives the total volume measured, and the volumes of the individual categories give the volume-% distribution:

$$\text{Vol } \%_i = \frac{V_i}{V_{total}}.$$

With the aid of the trapezium formula $$A = \sum \left(\frac{y_i + y_{i+1}}{2}\right) \cdot (x_{i+1} - x_i)$$

the area under the distribution curve is determined approximately, enabling determination of the respective interval for the particle diameter with which 10%, 50% and 90% of the total volume are exceeded. The final value of $d_{10}$, $d_{50}$, $d_{90}$ is calculated by linear interpolation within the corresponding interval.

FIG. 18 shows an example of a volume-% distribution diagram with the calculated values of $d_{10}$, $d_{50}$, $d_{90}$ and monodispersity, where $d_{10}=2.31$ μm, $d_{50}=3.73$ μm, $d_{90}=4.09$ μm and $d_{90}/d_{10}=1.77$.

For evaluation of the experiments carried out, it is important that the variance of the target quantities due to changing the parameter settings is significantly greater than the scatter caused by the measurement method. With repetition measurements, the measurement method was tested for interfering factors using the following measures:

repeated sampling measurement of a plurality of image sections of a sample multiple measurement of an image section Repetition measurements were carried out on two different batches. The results show that the method used is suitable for reproducing significant changes in the target quantities.

TABLE 8

Results from repetition measurements

| Batch | Sample | Image | Measurement | Monodispersity | $d_{50}$ [μm] |
|---|---|---|---|---|---|
| A | 1 | 1 | 1 | 1.99 | 3.21 |
|  | 1 | 1 | 2 | 2.05 | 3.22 |
|  | 1 | 2 | 1 | 1.98 | 3.33 |
|  | 2 | 1 | 1 | 1.93 | 2.99 |
| B | 1 | 1 | 1 | 2.31 | 2.94 |
|  | 2 | 2 | 2 | 2.38 | 2.88 |

The system of the dispersion polymerisation of N-vinylpyrrolidone in propyl propionate with azobisisobutyronitrile as initiator, a divinyl compound as crosslinking component and polyvinyl acetate (MW ~50,000) as steric stabiliser was investigated for its main influencing quantities and their effects with the aid of statistical experiment planning. Besides the influencing quantities and ranges defined above, the six reactors were additionally tested for individual effects on the target quantities. In order to keep within an acceptable framework with respect to the number of experiments, an experiment plan was carried out for mixing experiments. The individual experiments here were selected iteratively from the possible combinations in such a way that they are ideally suitable for matching of the proposed regression model. The model type selected contained linear, quadratic and interaction terms for the factors reaction temperature and the concentrations of NVP, AIBN and PVAc. The reactors were tested for linear influences as block parameters. With N=42 individual experiments, the experiment plan drawn up achieved a degree of efficiency of 75% (G efficiency), with the reproducibility being tested by random repetition experiments. Table 9 contains the experiment plan drawn up with MODDE 8 with the measurement results for the individual experiments.

TABLE 9

First experiment plan with results for the individual experiments

| Exp Name | Run Order | Temperature (°C.) | Block | [NVP] | [AIBN] | [PVAc] | $\frac{d_{90}}{d_{10}}$ | $d_{50}$ | Roundness |
|---|---|---|---|---|---|---|---|---|---|
| N9 | 1 | 62 | B1 | 3 | 0.5 | 0.8 | — | — | — |
| N10 | 10 | 62 | B2 | 3 | 2 | 5 | 2.52 | 2.28 | 1 |
| N20 | 16 | 78 | B3 | 3 | 0.5 | 5 | 2.76 | 4.33 | 1 |
| N23 | 23 | 62 | B4 | 3 | 0.5 | 5 | — | — | — |
| N33 | 29 | 78 | B5 | 5 | 0.5 | 5 | 2.25 | 2.91 | 2 |
| N39 | 35 | 78 | B6 | 5 | 0.5 | 12 | 2.83 | 3.60 | 3 |
| N3 | 2 | 70 | B1 | 4 | 0.5 | 0.8 | 1.62 | 3.21 | 1 |
| N11 | 11 | 62 | B2 | 5 | 0.3 | 5 | 2.21 | 3.30 | 1 |
| N17 | 17 | 62 | B3 | 5 | 2 | 5 | 1.64 | 1.60 | 1 |
| N24 | 24 | 62 | B4 | 6 | 1.25 | 12 | 1.40 | 1.05 | 1 |
| N22 | 29 | 78 | B5 | 5 | 0.5 | 5 | 2.27 | 2.57 | 1 |
| N35 | 36 | 62 | B6 | 3 | 2 | 5 | 1.73 | 3.38 | 1 |
| N4 | 7 | 78 | B1 | 3 | 2 | 5 | 1.81 | 2.18 | 1 |
| N14 | 12 | 78 | B2 | 3 | 0.5 | 0.8 | 2.71 | 2.98 | 1 |
| N21 | 18 | 78 | B3 | 5 | 1.25 | 5 | 2.25 | 2.78 | 1 |
| N42 | 25 | 70 | B4 | 4 | 2 | 5 | 1.90 | 1.78 | 1 |
| N34 | 31 | 78 | B5 | 5 | 2 | 12 | 2.29 | 1.56 | 1 |
| N40 | 37 | 78 | B6 | 6 | 2 | 12 | 1.82 | 1.60 | 1 |
| N1 | 4 | 62 | B1 | 4 | 2 | 0.8 | 1.80 | 2.30 | 1 |
| N12 | 13 | 62 | B2 | 6 | 0.5 | 18 | 2.10 | 0.70 | 1 |
| N18 | 19 | 62 | B3 | 6 | 2 | 18 | 1.77 | 0.93 | 1 |
| N25 | 26 | 62 | B4 | 6 | 2 | 18 | 1.83 | 0.88 | 1 |
| N29 | 32 | 62 | B5 | 3 | 2 | 0.8 | 1.75 | 4.20 | 1 |
| N38 | 38 | 78 | B6 | 3 | 2 | 0.8 | 2.38 | 4.16 | 1 |
| N2 | 5 | 62 | B1 | 5 | 1.25 | 12 | 1.56 | 0.73 | 1 |
| N15 | 14 | 78 | B2 | 6 | 1.25 | 18 | 1.72 | 0.86 | 1 |
| N19 | 20 | 70 | B3 | 6 | 0.5 | 12 | 3.14 | 2.10 | 3 |
| N27 | 27 | 78 | B4 | 4 | 2 | 0.8 | 3.29 | 5.53 | 2 |
| N31 | 33 | 62 | B5 | 6 | 2 | 12 | 2.94 | 1.13 | 1 |
| N37 | 39 | 70 | B6 | 6 | 1.25 | 18 | 2.06 | 1.13 | 1 |
| N5 | 8 | 78 | B1 | 6 | 0.5 | 12 | 1.51 | 1.14 | 1 |
| N13 | 15 | 70 | B2 | 5 | 2 | 5 | 2.28 | 2.49 | 2 |
| N7 | 29 | 78 | B3 | 5 | 0.5 | 5 | 1.96 | 3.17 | 3 |
| N28 | 28 | 78 | B4 | 6 | 0.5 | 18 | 1.60 | 0.91 | 1 |
| N8 | 29 | 78 | B5 | 5 | 0.5 | 5 | 2.33 | 3.04 | 3 |
| N36 | 40 | 62 | B6 | 5 | 0.5 | 5 | 2.30 | 2.97 | 1 |
| N6 | 9 | 78 | B1 | 6 | 2 | 12 | 1.45 | 1.05 | 1 |
| N41 | 25 | 70 | B2 | 4 | 2 | 5 | 1.99 | 2.55 | 1 |
| N26 | 25 | 70 | B3 | 4 | 2 | 5 | 2.31 | 2.94 | 1 |
| N16 | 29 | 78 | B4 | 5 | 0.5 | 5 | 1.72 | 2.34 | 3 |
| N30 | 34 | 62 | B5 | 6 | 0.5 | 18 | 3.38 | 1.26 | 1 |
| N32 | 29 | 78 | B6 | 5 | 0.5 | 5 | 1.93 | 4.25 | 3 |

For determination of the average particle size, firstly the distribution of the measurement values of $d_{50}$ was tested. These should have an approximately normal distribution, since otherwise problems arise in the statistical evaluation and the model formation.

FIG. 19 shows the distribution of the original measurement values of $d_{50}$.

In many cases, the values can be corrected by transformation to an approximately normal distribution. In this case, the target quantity is transformed with $y=y^{0.25}$. FIG. 20 shows the distribution of the transformed measurement values of $d_{50}$.

The following terms were used for the formation of the empirical model:

$$y = a_0 + a_1 Tmp + a_2 NVP + a_3 AIBN + a_4 PVAc + a_5 Block + a_6 Tmp^2 +$$
$$a_7 NVP^2 + a_8 AIBN^2 + a_9 PVAc^2 + a_{10} Tmp \cdot NVP + a_{11} Tmp \cdot AIBN +$$
$$a_{12} Tmp \cdot PVAc + a_{13} NVP \cdot AIBN + a_{14} NVP \cdot PVAc + a_{15} AIBN \cdot PVAc$$

In order to determine the model accuracy, measurement values are plotted against the values predicted by the model. A value of 89% is determined as the model accuracy. As a further test of the suitability of the model, the residues are checked for normal distribution. The model errors are plotted in a probability grid, with these lying on a straight line in the case of normal distribution. The residue distribution determined is satisfactory.

The individual model terms are subsequently tested for their statistical significance. When considering the significance of the individual model coefficients, it is apparent that many have very small values and/or have large confidence intervals (high uncertainty).

After stepwise reduction by deleting non-significant model terms, a model accuracy of 73% is found, which is still sufficiently accurate to predict fundamental trends.

FIG. 25 shows the graphical representation of the model coefficients determined with corresponding confidence ranges (reduced model).

However, only the influencing parameters of the concentrations of AIBN and PVAc prove to be statistically significant. They describe 73% of the variation of $d_{50}$.

With the model prediction, the course of the $d_{50}$ value on variation of the starting parameters in the range investigated is predicted. FIG. 26 shows a graphical comparison of the one-dimensional (left) and two-dimensional (right) model prediction for the change in the $d_{50}$ value.

For assessment of the monodispersity, the target quantity $d_{90}/d_{10}$ is evaluated analogously to the $d_{50}$ value. FIG. 27 shows the distribution of the original measurement values of $d_{90}/d_{10}$ in the form of bar diagrams.

Here too, a transformation was carried out with $y^* = y^{0.25}$, giving the distribution of the transformed measurement values of $d_{90}/d_{10}$ shown in FIG. 28. The model accuracy and the residue distribution for $d_{90}/d_{10}$ (complete model) were subsequently determined on the basis of the measurement values determined.

In this case, however, inadequate model accuracy was determined, and, owing to the poor modelling results for the monodispersity, the series of experiments carried out were tested for possible interfering quantities which have an effect on the size distribution.

The limits of the parameter values were set in the experiment plan in such a way that the greatest possible value range could be investigated for its influence on the system. Parameter combinations which do not ensure an optimum experiment execution therefore occurred within the experiment plan. This was evident in the form of caking on reactor wall and stirrer. It remained unclear here whether this involved the accumulation of particles of a preferred size class (a type of classification), so that the true value of the size distribution was not reproduced in the measurement. In order to eliminate this lack of clarity, a total of 12 individual experiments during the performance of which increased caking occurred were deleted from the series of experiments. A further evaluation of the monodispersity was carried out with a simplified model with the remaining results.

After this reduction, the model accuracy of ~60% can now be regarded as adequate for correct reproduction of fundamental trends.

The evaluation of the simplified model for the change in the monodispersity showed that the size distribution of the particles is significantly influenced by the reactors used. Furthermore, there is a pronounced quadratic influence of the temperature and a linear influence of the concentration of AIBN (see FIG. 18). The best values of the monodispersity were determined at 2.0% of AIBN and 78° C.

On the basis of the results from the first experiment plan, new ranges were defined for a second experiment plan and additional experiments were carried out. Firstly in order to test the reactors more accurately for their influence on the target quantities, and secondly the predicted trend of the influence of the reaction temperature was investigated beyond the range defined in the first experiment plan.

In order to investigate the influence of the reaction temperature on the monodispersity, further series of experiments A and B were carried out with different compositions above and below the reaction temperature range used in the first experiment plan. The temperature range above 80° C. surprisingly proves to be advantageous for the values of both target quantities. In the second experiment plan, the reaction temperature range to be investigated is corrected to 75° C.-85° C.

Owing to the fact that the concentration of PVAc is tied to the concentration of NVP, a relatively narrow range is selected for these influencing quantities, of which, based on the results from the first experiment plan, the best values of the two target quantities are to be expected.

Since the previous experiments had shown a disadvantageous effect due to changing the concentration of AIBN, the concentration of AIBN in the following experiments was merely narrowed within the range investigated to date to concentrations in the range 0.9%-1.4%.

TABLE 10

Parameter ranges for the second experiment plan

| Varying parameters | |
|---|---|
| [NVP] | 4.5%-5.3% |
| [PVAc] | 6%-8% |
| [AIBN] | 0.9%-1.4% |
| Reaction temperature | 75° C.-85° C. |
| Fixed parameters | |
| [DVC] | 1.0% |
| Temperature rate | 1° C./min |
| Stirrer speed | 200 rpm |
| Reaction time (incl. heating phase) | 16 h |

TABLE 11

Second experiment plan with results for the target quantities

| | | | | Results: | |
|---|---|---|---|---|---|
| Temp. | [NVP] | [AIBN] | [PVAc] | $\frac{d_{90}}{d_{10}}$ | d50 |
| 75 | 4.50 | 1.40 | 6.00 | 1.92 | 2.51 |
| 75 | 5.30 | 0.90 | 8.00 | 2.37 | 1.66 |
| 75 | 4.90 | 1.15 | 7.00 | 2.24 | 1.82 |
| 75 | 5.03 | 0.90 | 6.00 | 2.21 | 2.04 |
| 75 | 5.30 | 1.40 | 8.00 | 2.48 | 1.70 |
| 75 | 4.90 | 1.40 | 7.00 | 2.05 | 2.11 |
| 75 | 4.90 | 1.15 | 6.00 | 2.10 | 1.98 |
| 75 | 5.30 | 1.40 | 8.00 | 2.00 | 1.64 |
| 75 | 5.30 | 1.15 | 7.00 | 2.14 | 1.84 |
| 75 | 4.50 | 1.40 | 6.00 | — | — |
| 75 | 4.90 | 1.15 | 7.00 | 2.41 | 1.82 |
| 75 | 5.30 | 1.07 | 8.00 | 2.30 | 1.91 |
| 75 | 4.50 | 0.90 | 8.00 | 1.85 | 2.67 |
| 75 | 5.30 | 1.40 | 6.00 | — | — |
| 75 | 4.90 | 1.40 | 7.00 | 1.95 | 1.99 |
| 75 | 4.50 | 0.90 | 6.67 | 2.09 | 2.24 |
| 75 | 4.90 | 1.15 | 7.00 | 2.14 | 1.84 |
| 75 | 4.50 | 1.40 | 8.00 | 2.10 | 2.14 |
| 75 | 5.03 | 0.90 | 8.00 | 2.63 | 1.75 |
| 75 | 4.50 | 1.23 | 8.00 | 2.12 | 1.67 |
| 75 | 4.50 | 0.90 | 6.00 | 2.18 | 2.37 |
| 75 | 5.30 | 0.90 | 6.00 | 1.74 | 1.95 |
| 75 | 5.30 | 0.90 | 6.67 | 2.28 | 1.73 |
| 75 | 5.30 | 1.40 | 6.00 | 2.01 | 1.95 |
| 85 | 5.30 | 1.40 | 8.00 | 1.56 | 2.38 |
| 80 | 5.30 | 1.15 | 7.00 | 1.85 | 2.40 |
| 85 | 4.50 | 0.90 | 8.00 | 1.70 | 3.51 |
| 85 | 4.50 | 1.40 | 6.00 | 1.63 | 3.72 |
| 85 | 5.30 | 0.90 | 6.00 | 1.78 | 3.25 |
| 80 | 4.90 | 0.90 | 7.00 | 1.89 | 3.36 |
| 85 | 5.30 | 0.90 | 8.00 | 1.86 | 2.72 |
| 85 | 5.30 | 1.40 | 6.00 | 1.77 | 3.08 |
| 85 | 4.50 | 1.40 | 8.00 | 1.73 | 3.29 |
| 80 | 4.90 | 1.15 | 7.00 | 1.83 | 2.79 |
| 85 | 4.50 | 0.90 | 6.00 | 1.95 | 3.85 |
| 85 | 5.30 | 1.40 | 6.00 | 1.75 | 3.26 |
| 80 | 4.90 | 1.15 | 6.00 | — | — |

In Table 10, the value ranges of the influencing quantities defined for the second experiment plan are compared. Table 11 contains the individual experiments and the results thereof. The model type is D optimal, as in the first experiment plan, taking into account the terms for the description of linear effects, interactions and quadratic effects. The second experiment plan is evaluated analogously to the first.

In FIG. 38, the distribution of the original measurement values of the average particle size is depicted in the form of bar diagrams. For statistical evaluation, the measurement values are again transformed with $y^* = y^{0.25}$. The distribution of these transformed measurement values is likewise depicted in FIG. 39 in the form of bar diagrams. For evaluation of the model accuracy, the determined and expected $d_{50}$ values were again plotted against one another and the residues were determined.

In FIG. 42, the model coefficients are plotted in the form of bar diagrams with corresponding confidence ranges for the $d_{50}$ values under the influence of the varied quantities temperature and concentration of NVPy and PVAc.

For the reaction conditions selected in the second experiment plan, a very robust model can be set up in order to describe the effects of the influencing quantities (see FIG. 42). The main influence on the average particle size in the range investigated starts from the reaction temperature. A significant influence on the $d_{50}$ value is likewise to be expected on changing the concentrations of NVP and PVAc.

FIG. 23 shows two-dimensional model predictions for the change in the $d_{50}$ value at the average level for AIBN and at various concentrations of PVAc, more precisely at 6%, 7%, 8% (from left to right).

FIGS. 22 and 23 show the model predictions for the change in the range investigated as significant influencing quantities.

Optimum results for the $d_{50}$ value are to be expected in the reaction temperature range between 81° C. and 85° C. at a low concentration level for PVAc and NVP.

Figure 24:
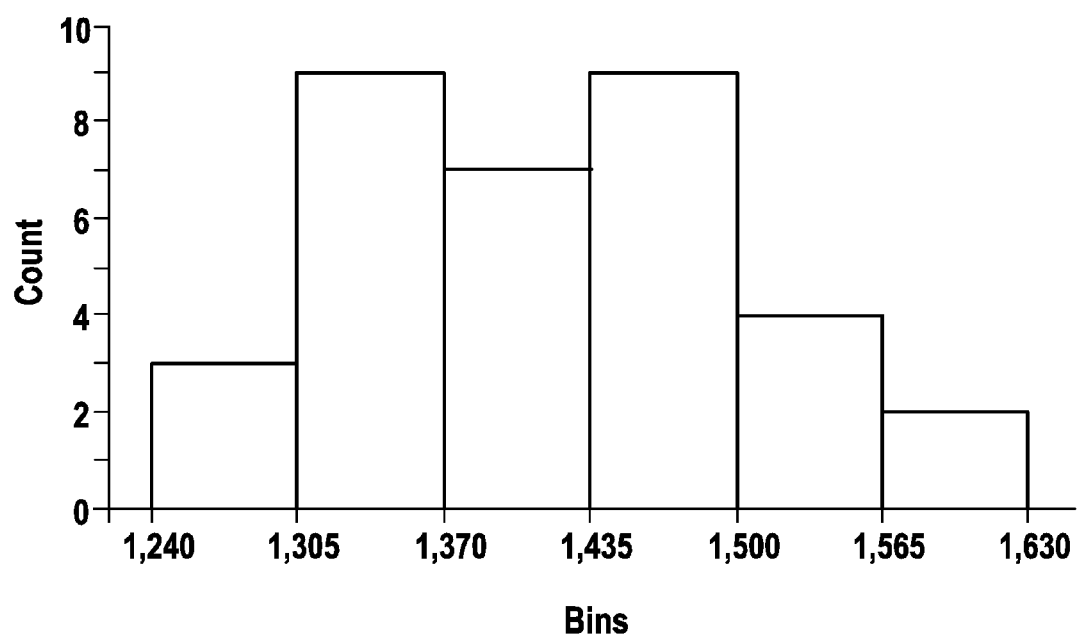

The distribution of the original measurement values of the monodispersity in the form of bar diagrams corresponds to expectations, but is slightly skewed to the left. The values are transformed with $y^* = y^{0.5}$. FIG. 24 shows the distribution of the transformed measurement values in the form of bar diagrams.

Owing to the poor modelling results for the quotient $d_{90}/d_{10}$ in the first experiment plan, the reproducibility of the results is firstly assessed on the basis of repetition experiments.

Figure 25:
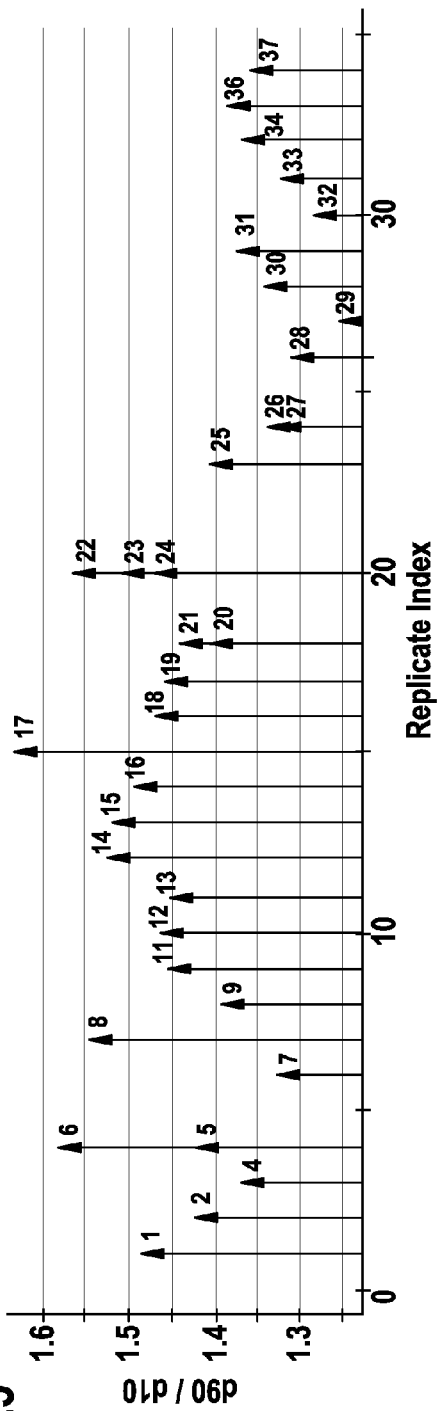

In FIG. 25, the ratio $d_{90}/d_{10}$ is plotted against the "replicate index" in order to assess the reproducibility. The reproducibility can be evaluated as adequate. The scatter in the repetition experiments is significantly less than the overall variance of the target quantity owing to changed experiment settings.

The model accuracy for the quotient $d_{90}/d_{10}$ and the residue distribution of the complete model (a) and of the reduced model (b) are again assessed here.

Figure 26:
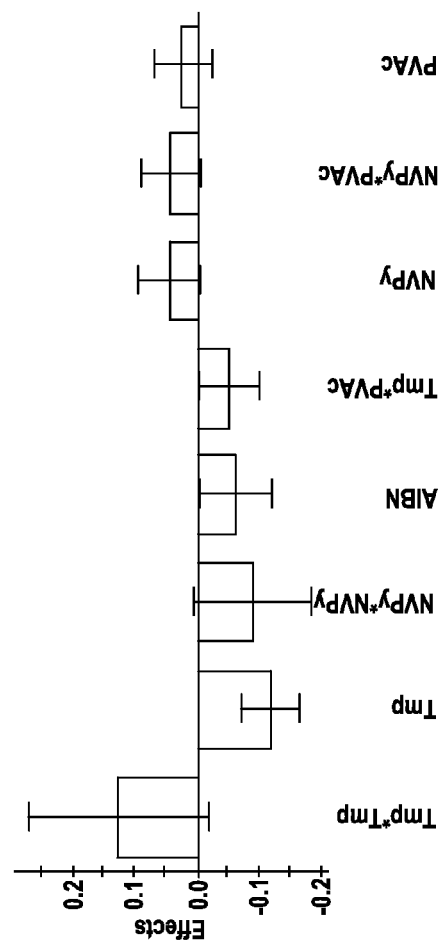

After elimination of an outlier experiment, the residues in the remaining model prove to have an approximately normal distribution. FIG. 26 shows the corresponding model coefficients with corresponding confidence ranges for $d_{90}/d_{10}$ as bar diagrams. The model determined in this way for the effects of the influencing quantities in the range investigated has good model accuracy of 72.7%. The main influencing quantities on the monodispersity are the reaction temperature and the concentration of NVP. The concentrations of AIBN and PVAc should only be considered secondarily here. On the basis of the confidence ranges determined for the individual model terms, it should be taken into account in the model predictions that they are afflicted with significant uncertainties (see FIG. 26).

The further evaluation of the experiments shows a significant reduction in the value of $d_{90}/d_{10}$ by increasing the temperature from 75° C. to about 80° C.

From this point, the values remain virtually constant. In addition, small values of the target quantity $d_{90}/d_{10}$ are expected in the investigated range for low concentrations of NVP and high concentrations of AIBN and PVAc. However, the in some cases large confidence ranges bring high uncertainty here.

The results from the second experiment plan are summarised as follows:

Significantly better values of the average particle size and the monodispersity were achieved by considering the reaction temperature over a greater working range. In addition, the system investigated is described by a usable model for the change in $d_{50}$ and $d_{90}/d_{10}$ in the ranges used, with varying experiment parameters.

On the basis of the data determined in the second experiment plan, a multi-quantity optimisation was carried out for the two target quantities. Experiment settings for which values of the quotient $d_{90}/d_{10} < 1.7$ and for $d_{50} > 2.5\mu$ were to be expected were determined here.

In addition to the results from the second experiment plan, experiments on target quantity optimisation, which linked directly to the model predictions, were carried out.

In further experiments, the aim was to investigate whether the change in the values of $d_{90}/d_{10}$ and $d_{50}$ as a function of the influencing quantities also continues outside the ranges investigated and whether further optimisation is possible with respect to the target quantities. To this end, series of experiments were carried out in which the reaction conditions of the previous optimum were used and these remained constant apart from the component to be investigated.

For both target quantities $d_{90}/d_{10}$ and $d_{50}$, the further experiments showed that the range 80° C.-85° C. is advantageous as reaction temperature. After a significant improvement in the values of both target quantities in the case of a temperature increase from 75° C. to 80° C., the curve flattens out considerably, meaning that no further optimisation is to be expected by increasing the reaction temperature.

The curve as a function of the AIBN concentration shows a decreasing trend in the value of the quotient $d_{90}/d_{10}$ with increasing concentration, while the average particle size does not change significantly in the range investigated.

The results from the second experiment plan for the NVP concentration in the range from 4.5% to <5.3% showed a trend towards advantageous values of the two target quantities at lower NVP concentrations. The range <4.5% of NVP therefore remained to be investigated in addition.

A change in the concentration of PVAc causes a negative correlation of the two target quantities. Further investigations were therefore carried out in the ranges <6% and >8%.

Many of the experiments carried out give rise to bimodal size distributions, where the particles in the respective size classes have a relatively narrow distribution (see FIG. 27). The polarity of the reaction medium is ascribed in the literature as having a crucial influence on the final particle size and particle size distribution [19]. The changes in the polarity were caused in further experiments by mixing propyl propionate with ethanol, isopropanol and 1,4-dioxane in various ratios. The basis selected for the investigations is a recipe with which significant bimodality is to be expected in the size distribution. FIG. 27 shows firstly the size distribution and secondly a photograph of the particles formed for an example of a batch having a bimodal size distribution.

Figure 28:
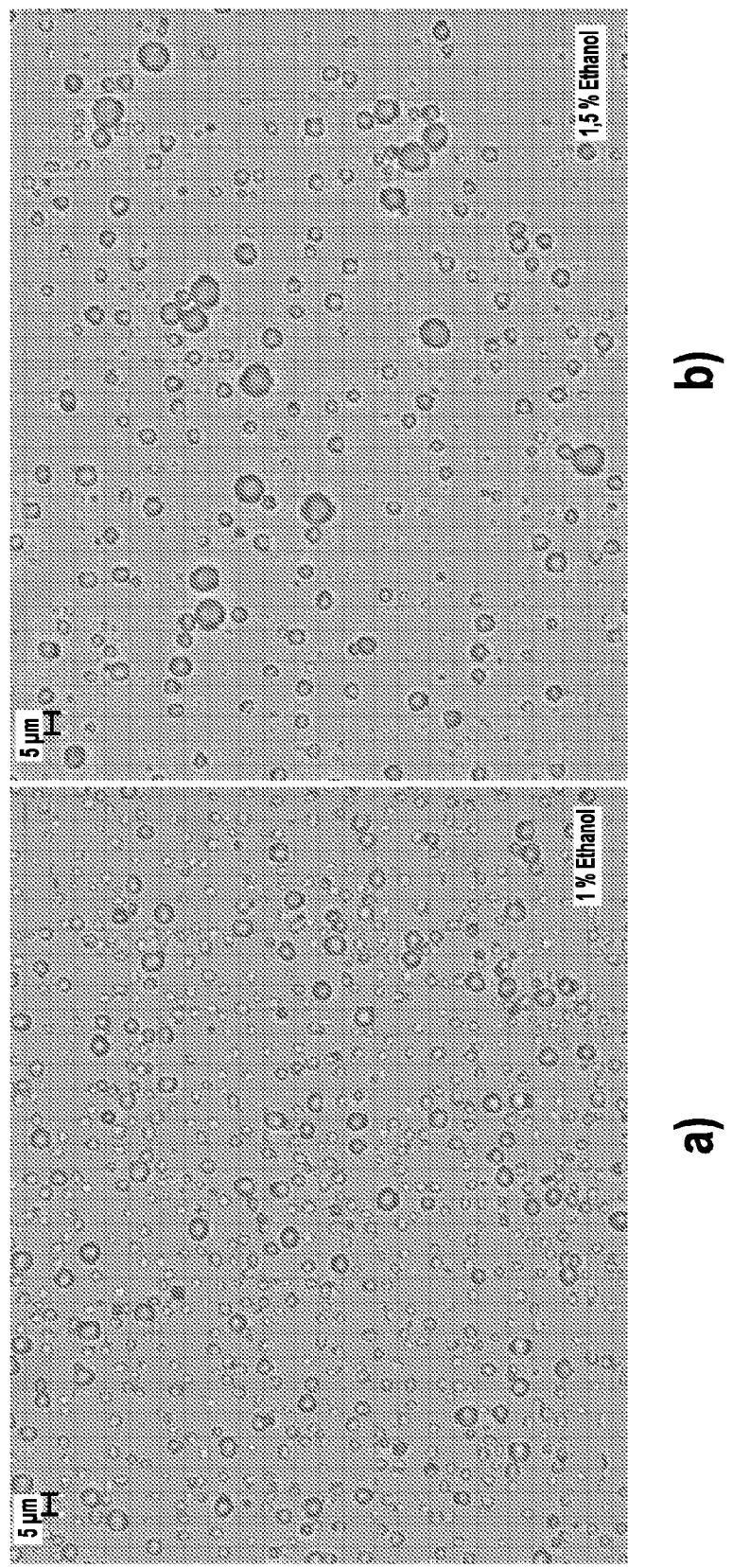

The experiments have shown that only the use of less than 5% of ethanol or isopropanol, based on the solvent, enables the precipitation of isolated PVP particles. With increasing ethanol or isopropanol concentration, the particles become larger and less round with a broad size distribution. At concentrations >5%, the PVP no longer precipitates out in particulate form. FIGS. 28 a) and b) shows polymerisation results on increasing the ethanol concentration from 1% to 1.5%.

Figure 29:
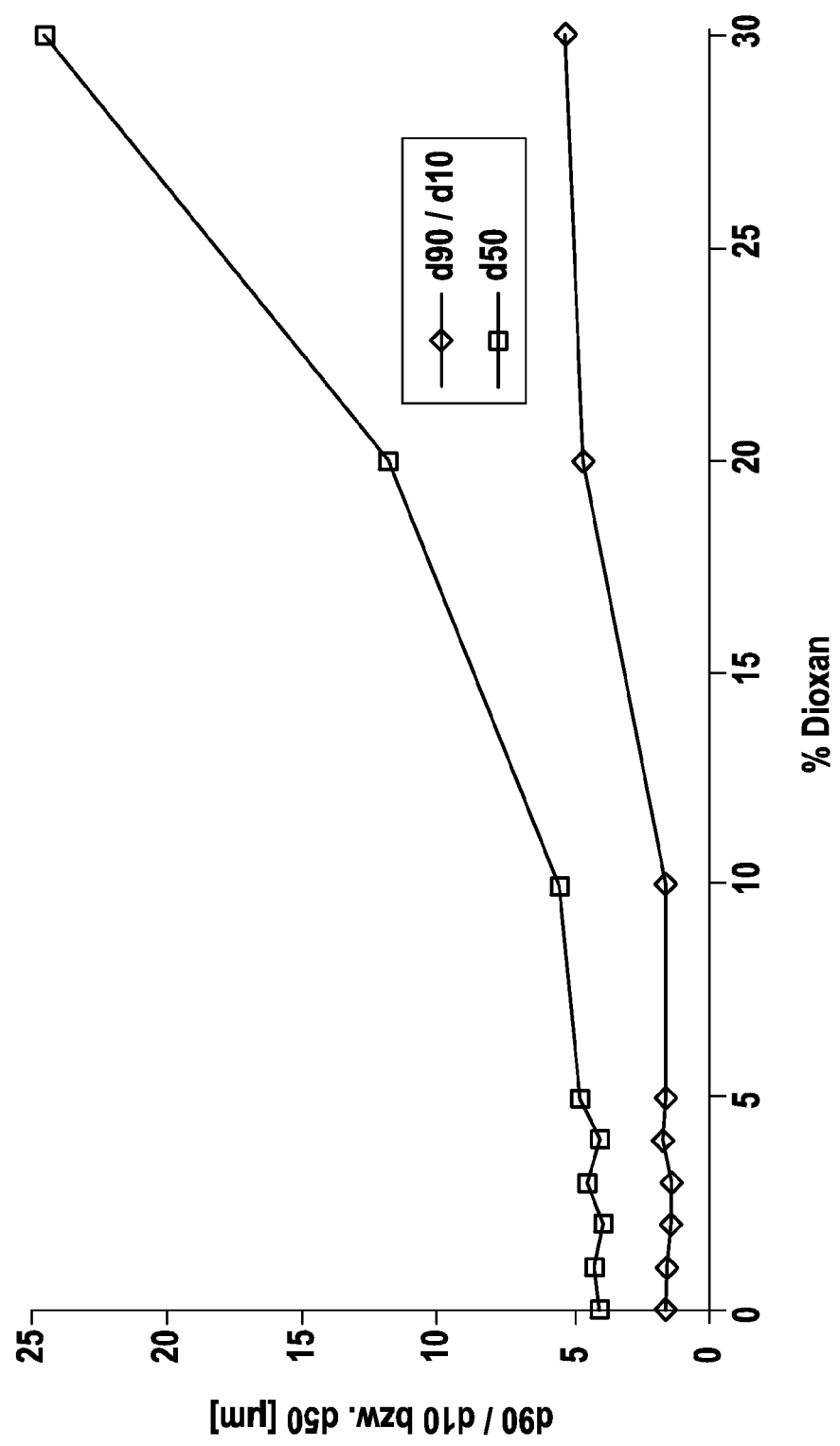

The influence found for dioxane on the experimental results is shown in Table 12 and the diagram in FIG. 29.

TABLE 12

Influence of dioxane

| Monodispersity [$d_{90}/d_{10}$] | Particle size $d_{50}$ [μm] | Dioxane [%] |
|---|---|---|
| 1.53 | 3.97 | 0 |
| 1.56 | 4.20 | 1 |
| 1.39 | 3.84 | 2 |
| 1.38 | 4.49 | 3 |
| 1.74 | 4.02 | 4 |
| 1.57 | 4.72 | 5 |
| 1.64 | 5.53 | 10 |
| 4.61 | 11.83 | 20 |
| 5.33 | 24.46 | 30 |

FIG. 29 shows a diagram of the dependence of the $d_{50}$ value and the quotient $d_{90}/d_{10}$ on the dioxane proportion.

As is evident in Table 12 and the diagram in FIG. 29, the addition of dioxane in relatively low concentrations only results in a slight advantage in the monodispersity (2%-3% of dioxane). By contrast, the addition of 5%-10% of dioxane has a positive effect on the $d_{50}$ value, with the size distribution remaining virtually constant. On addition of more than 10% of dioxane, significantly larger particles having a broad size distribution form. From an addition of 30% or more of dioxane, the polymer no longer precipitates out in particulate form.

Figure 30:
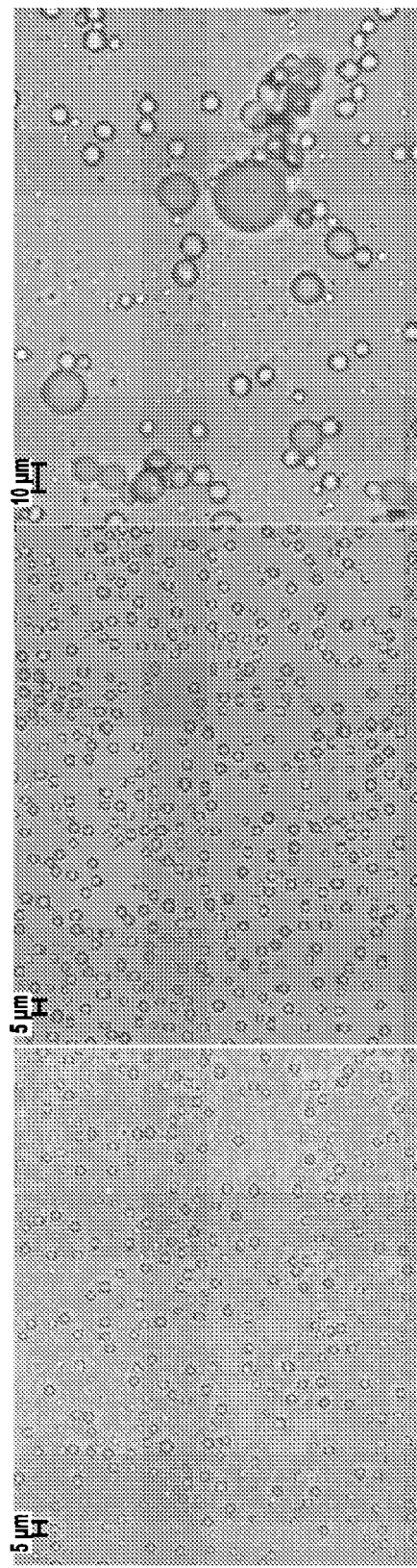

FIGS. 30 a), b) and c) show experimental results obtained with 0%, 2% and 20% of dioxane.

Scale-up and Transfer of the Experimental Results to a 2 l Double-jacket Apparatus On transfer of the experiments from the laboratory scale to a semi-industrial batch, it is checked how sensitively the system reacts to the boundary conditions thus modified.

The scale-up experiments are carried out using a 2 l glass double-jacket apparatus whose jacket temperature is regulated with the aid of a water circuit. The first experiment is carried out using the recipe of a batch which was carried out a number of times in the Chemspeed automatic synthesiser (M100) and gave reproducible results and can thus be regarded as robust. Instead of the nitrogen/vacuum flushing, as carried out in the M100, the polymerisation in the double-jacket apparatus proceeds under a nitrogen atmosphere. This is ensured by the constant supply of nitrogen at 0.2-0.4 bar.

Further primary differences from the design of the automatic synthesiser are in the geometry and the material of the reactor and stirrer, and in the associated flow behaviour and heat transfer.

Performance of the Polymerisation in a 2 Litre Glass Double-jacket Reactor (DJA):

84 g of polyvinyl acetate (PVAc, 50,000 g/mol) are dissolved in 1250 g of deionised water at room temperature in a 2 liter DJA. 0.63 g of N,N-divinylethyleneurea (DVC, BASF Ludwigshafen) and 0.882 g of azobisisobutyronitrile (AIBN) are dissolved in 63 g of N-vinylpyrrolidone (NVP) at room temperature in a conical flask. The organic phase is introduced into the DJA with stirring (impeller stirrer, 200 rpm). The mixture is heated from room temperature to 85° C. at a heating rate of 1 K/min with nitrogen flushing and kept at this temperature for 16 h. The mixture is subsequently cooled to room temperature at a cooling rate of about 2 K/min, and the dispersion is analysed by light microscopy. The results of the light microscopy analysis are shown in Table 14.

Performance of the Polymerisation in Multiplant M100 Reactors:

The following amount data relate to the filling of one of typically six Multiplant M100 (Chemspeed Technologies AG) reactors employed. Each of the reactors has a reaction volume of about 60 ml.

2.4 g of polyvinyl acetate (PVAc, 50,000 g/mol) are dissolved in 35.8 g of deionised water at room temperature in a conical flask. 0.018 g of N,N-divinylethyleneurea (DVC) and 0.025 g of AIBN are dissolved in 1.8 g of N-vinylpyrrolidone (NVP). The two phases are introduced at room temperature into one of the M100 reactors, the latter is sealed, and an inertisation cycle (three times vacuum for 5 min followed by nitrogen aeration) is carried out with stirring at 150 rpm. The polymerisation is then initiated using the software by heating to a polymerisation temperature of 85° C. at a heating rate of 1 K/min. The polymerisation temperature is held for 16 h, and the mixture is then cooled to room temperature and analysed by light microscopy (results see Table 14).

The first scale-up experiment is carried out under the reaction conditions shown in Table 13. The results are shown in Table 14 and FIG. 31.

TABLE 13

Data for the first scale-up experiment

| | Relative | Absolute data | |
|---|---|---|---|
| Recipe | data [%] | M100 [g] | DMA [g] |
| NVP | 4.5 | 1.8 | 63 |
| AIBN | 1.4 | 0.025 | 0.882 |
| PVAc | 6.0 | 2.4 | 84 |
| DVC | 1.0 | 0.018 | 0.630 |
| Total batch | 100 | 40 | 1400 |

| Process management | |
|---|---|
| Reaction temperature | 85° C. |
| Temperature rate | 1° C./min |
| Stirrer speed | 200 rpm |
| Reaction time | 16 h |

FIGS. 31 a) and b) show for comparison enlarged photographs of batches from M100 (a) and DJA (b).

TABLE 14

Comparison of the batches from M100 and DJA

| Reproducibility experiments | | $d_{90}/d_{10}$ | $d_{50}$ |
|---|---|---|---|
| M100 | Reactor 5 | 1.53 | 3.97 |
| | Reactor 2 | 1.63 | 3.72 |
| | Reactor 3 | 1.61 | 3.21 |
| | Reactor 5 | 1.51 | 3.91 |
| | Reactor 6 | 1.42 | 2.97 |
| DJA | | 1.50 | 3.07 |

On the basis of the results from the scale-experiment, the recipe can be regarded as having been transferred from a 40 g batch (M100) to a 1400 g batch (DJA). While the absolute values of $d_{50}$ and $d_{90}/d_{10}$ are subject to reactor-specific variations (see Table 14), the characteristic size distribution is reproducible (see FIG. 31).

Figure 32:
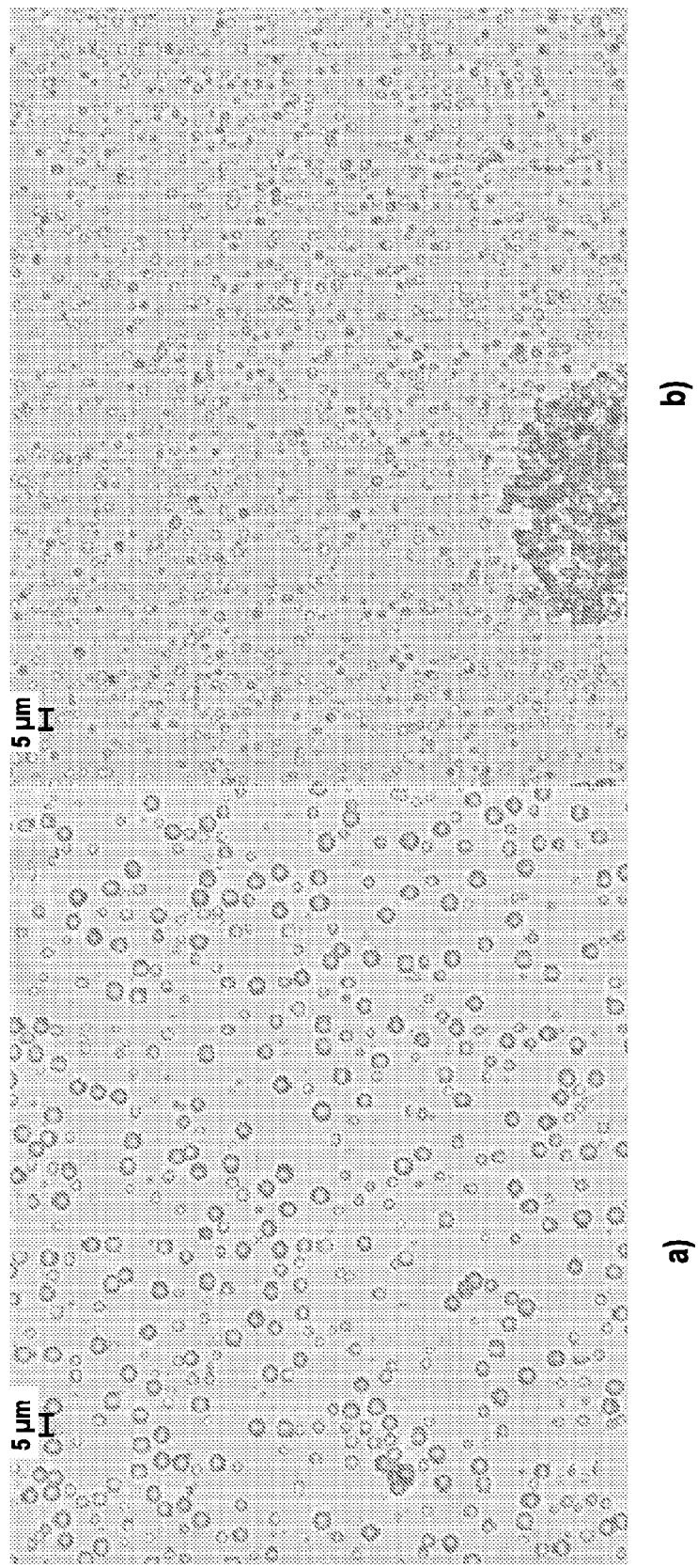

In further experiments, the crosslinking agent concentration is increased from 1.0% to 2.0% or 1.5%, since variation of the degree of crosslinking of the polymer particles formed is of importance for later swelling experiments. When increasing the crosslinking agent content, however, significant differences are evident between the results from the M100 and the DJA. The change from 1% to 2% of DVC merely causes a slightly disadvantageous effect in the M100 with respect to the target quantities $d_{50}$ and $d_{90}/d_{10}$. In the DJA, by contrast, the increased proportion of DVC, under otherwise constant conditions, causes considerable caking, agglomeration and melting of the particles. In addition, the particles have considerably different characteristics in particle size, size distribution and sphericity (see FIGS. 32 a) and b)). FIGS. 32 a) and b) show for comparison enlarged photographs of the polymer particles obtained from the batches from M100 and DJA with 2% of DVC.

Agglomeration and caking are primarily a phenomenon on use of excessively high monomer or excessively low stabiliser concentrations. While an increase in the stabiliser concentration from 6% to 10% has no effects, a reduction in the monomer concentration from 4.5% to 2.0% resulted in no further agglomeration and caking. However, the particles per se do not have improved characteristics. The result also remains unchanged on variation of the stirrer type and stirrer speed for equalisation of the flow conditions in the DJA and M100.

Furthermore, the polyvinylpyrrolidone particles produced were investigated for their swelling behaviour with the aid of swelling experiments in order to be able to provide information on the suitability of the particles for seed polymerisation and thus for the production of macroporous polymer particles for the preparation of protein mixtures.

In the literature, seed polymerisation techniques starting from polystyrene seed particles in polar reaction media, usually water/ethanol mixtures, are described [23-28]. Since, in contrast to polystyrene, a very hydrophilic polymer is present in the form of PVP, the swellability of the particles in various solvents is tested.

For preparation for the swelling experiments, the particles are washed with propyl propionate in order to separate off the reaction mixture. To this end, the particles are firstly sedimented in the centrifuge in a number of cycles and, after the clear supernatant has been poured off, re-dispersed in propyl propionate. These washing cycles are repeated with the corresponding solvent on each solvent change. In general, monomers have high affinity for their polymers, so N-vinylpyrrolidone is used as swelling agent for the following experiments.

Table 15 shows all the experiments carried out for investigation of the swelling properties of the PVP particles produced, with results.

TABLE 15

Results of the swelling experiments carried out

| Starting material | Pretreatment | Results of the swelling experiments (Data relate to the mass of NVP originally employed) |
|---|---|---|
| 1% crosslinked | Original reaction mixture | With twice and 5 times the amount of NVP, the particles remain unchanged. With 10 times the amount of NVP, the particles begin to dissolve. |
| | Washed in propyl propionate | As in original reaction mixture. |
| | Washed in water | Particles are unstable in water (film formation). |
| | Washed in toluene | $d_{50}$ is reduced from 3.07 μm to 2.54 μm. With twice the amount of NVP, solution phenomena of the particles can be observed. |
| | Washed in n-hexane | Particles combine to form flowable agglomerates. NVP is absorbed immediately by particles on addition, and a homogeneous, yellowish "gel phase" forms. |
| | Washed in dioxane | Solution phenomena → particles are unstable. |
| 1.5% crosslinked | Original reaction mixture | With twice and 5 times the amount of NVP, the particles remain unchanged. With 10 times the amount of NVP, the particles begin to dissolve. |
| | Washed in propyl propionate | As in original reaction mixture. |
| | Washed in water | $d_{50}$ is increased from 1.37 μm to 2.32 μm. No change in the particles on addition of 10 times the amount of NVP. |
| | Washed in toluene | Particles become smaller and agglomerate. No change in the particles on addition of 10 times the amount of NVP. |
| | Washed in n-hexane | Particles combine to form flowable agglomerates. NVP is absorbed immediately by particles on addition, and a homogeneous, yellowish "gel phase" forms. |
| | Washed in dioxane | Particles become smaller, in some cases solution phenomena. |

Figure 33:
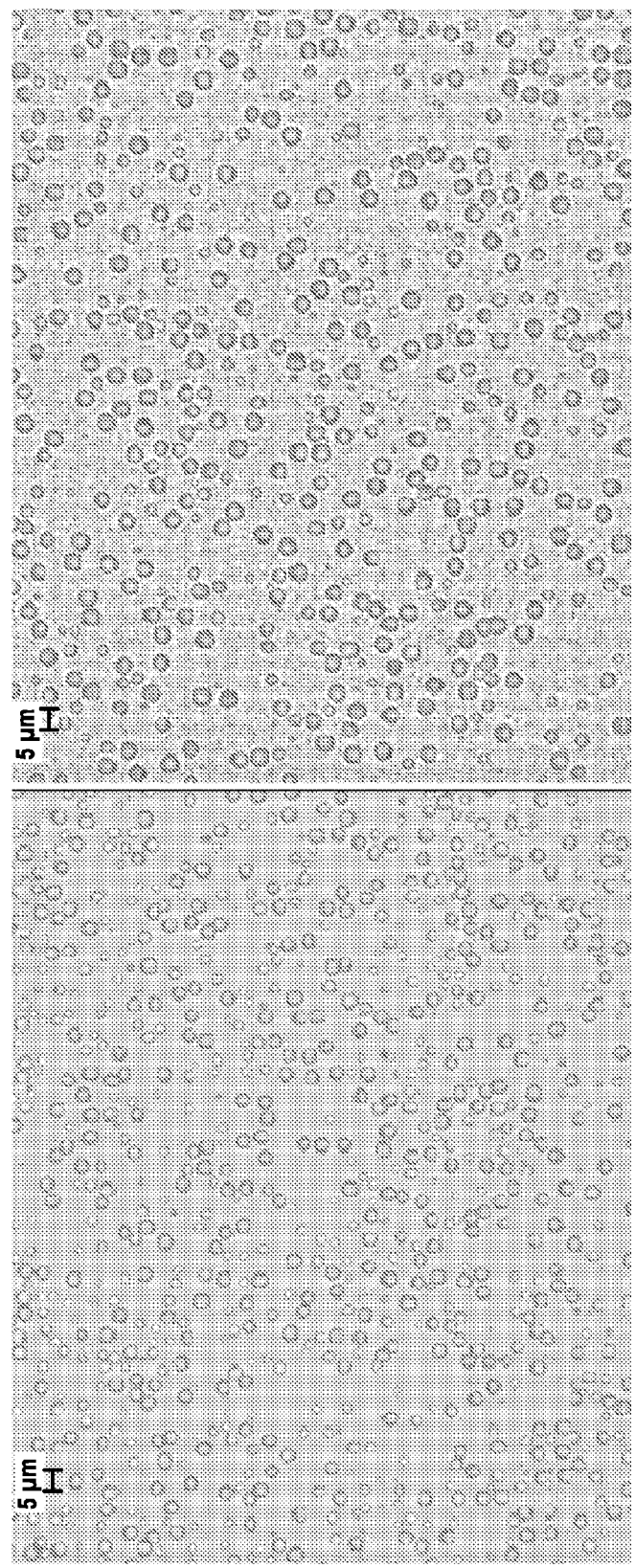

The following knowledge can be obtained from the experiments:
  PVP particles having a crosslinking agent content of 1% are unstable in water, in contrast to 1.5% crosslinked particles
  Water is a better swelling agent for PVP and toluene a worse one than propyl propionate
  Swelling effects due to the addition of NVP can only be observed in n-hexane for the solvents investigated
  1.5% crosslinked PVP particles are unstable to NVP In a further experiment, twice the amount of NVP, based on the mass originally employed, comprising 1% of AIBN was metered into the original reaction mixture. This mixture was subjected to the standard polymerisation conditions. The average particle diameter has grown from $d_{50}$=3.07 μm to $d_{50}$=3.86 μm under these conditions. Caking and new, significantly smaller particles give rise to the conclusion that the NVP is located both in the solvent and also in the particles after addition (see FIGS. 33 a) and b)). FIGS. 33 a) and b) show enlarged photographs of the particles formed under the influence of the addition of different amounts of NVP to the original reaction mixture followed by polymerisation.

In detail, the different process parameters have a considerable effect on the particles formed and their properties. In order to obtain reproducible results, the influencing quantities were investigated by a planned series of experiments.

Our own corresponding experiments have shown that the reaction temperature represents the principal influencing quantity on both target quantities. While the change in the reaction temperature in the range between 62° C. and 78° C. only has a slight effect on the monodispersity, the average particle size is not influenced significantly. On increasing the temperature to 80° C.-85° C., however, significantly larger particles having a narrower size distribution are generated. Further experiments have shown that good polymerisation results are also still obtained at temperatures above 85° C. Overall, the experiments have shown that, depending on the desired later area of application of the particles, the polymerisation can be carried out at temperatures in the range from 60 to 90° C.

Figure 34:
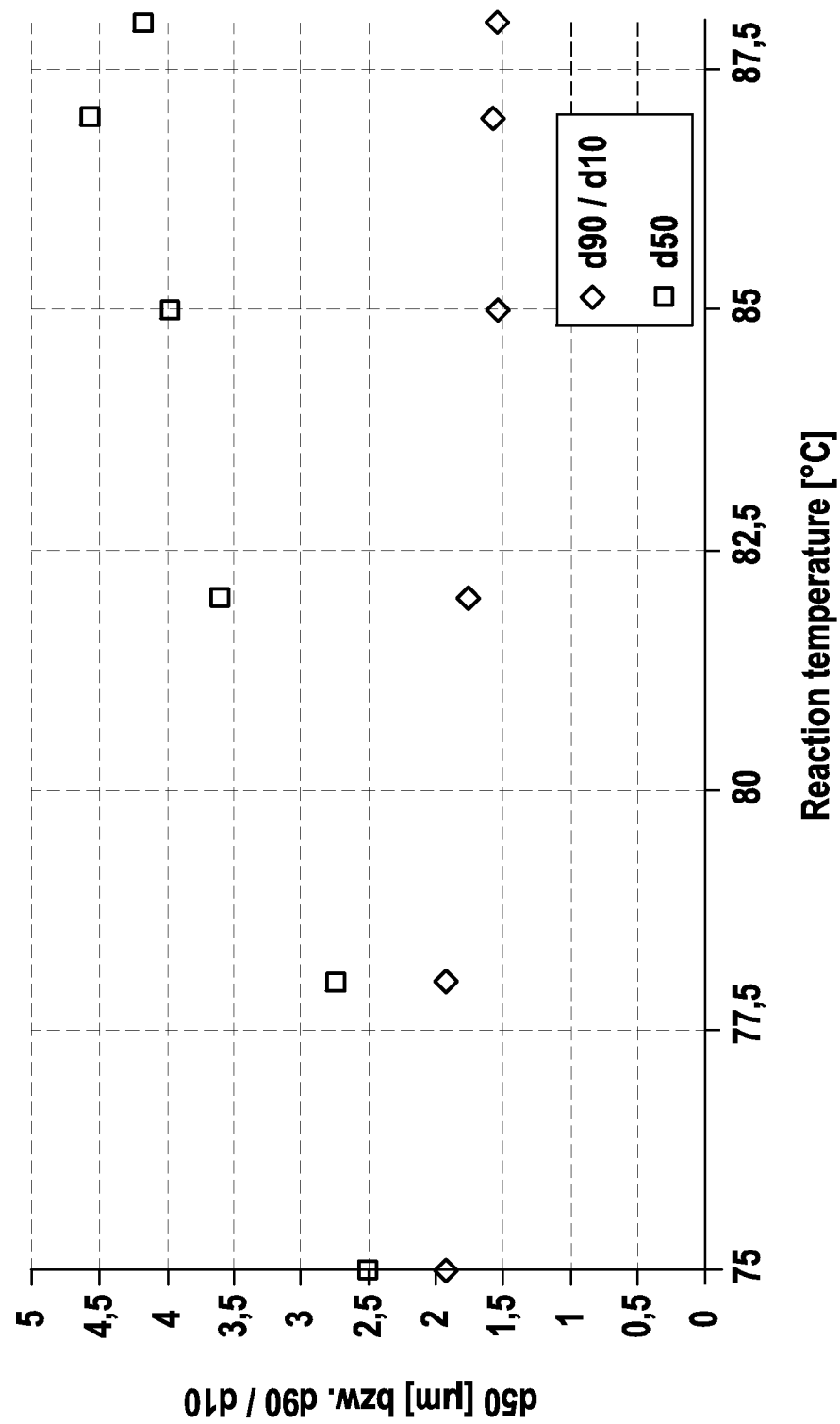

FIG. 34 shows a diagram of the dependence of the target quantities $d_{50}$ and $d_{90}/d_{10}$ on the reaction temperature at different concentrations of NVP (=4.5%), AIBN (=1.4%), PVAc (=6%).

The influence of the concentration of AIBN has also proven to be significant in the series of experiments carried out. By varying the initiator content, it has been found that a negatively correlating change in the values of the target quantities arises in a concentration range between 0.5% and 2.0%, at reaction temperatures of 62° C.-78° C. This means that, for low AIBN concentrations, large particles having a broad size distribution can be expected. In the range between 0.9% and 1.4% of AIBN, at 75° C.-85° C., no significant effects on the average particle size were found. With 1.4% of AIBN, however, somewhat lower values of $d_{90}/d_{10}$ can be expected. In a supplementary series of experiments, the concentration of AIBN was varied between 0.2% and 5.0%, at T=85° C. (see FIG. 35). Whereas the average particle size decreases in this range with increasing AIBN content, no clear trend is evident with respect to the values of $d_{90}/d_{10}$.

The values of the monodispersity are at a virtually constant level in the case of these settings, irrespective of the concentration of AIBN. In the concentration range of AIBN of <0.5%, quantitatively sufficient precipitation of the PVP particles was not effected. At a concentration of AIBN >4%, by contrast, agglomeration occurs.

FIG. 62 shows a diagram of the dependence of the target quantities $d_{50}$ and $d_{90}/d_{10}$ on the AIBN concentration at T=85° C. and an NVP concentration=4.5% and a PVAc concentration of 6%.

The influence of the concentration of PVAc as stabiliser was investigated in a concentration range between 0.8% and 18%, at 62°-78° C. In this range, the concentration of PVAc represents the principal influencing quantity on the average particle size. At low PVAc concentrations, large particles can be expected. No significant influences are evident on the particle size distribution. Further experiments were carried out in a concentration range between 6%-8% and at 75° C.-85° C. These showed that the concentration of PVAc employed has a significant effect on the particle sizes, more precisely a negatively correlating effect on the values of $d_{50}$ and $d_{90}/d_{10}$. This trend has also been confirmed by experiments in which PVAc was employed in concentrations between 2.5% and 10%, at T=85° C. (see FIG. 36), meaning that particle diameters can be planned fairly well in advance under certain reaction conditions on the basis of the results found. The prediction of the lowest value of $d_{90}/d_{10}$ at 8% of the PVAc also agreed, for example, with the results of the series of experiments.

Figure 36:
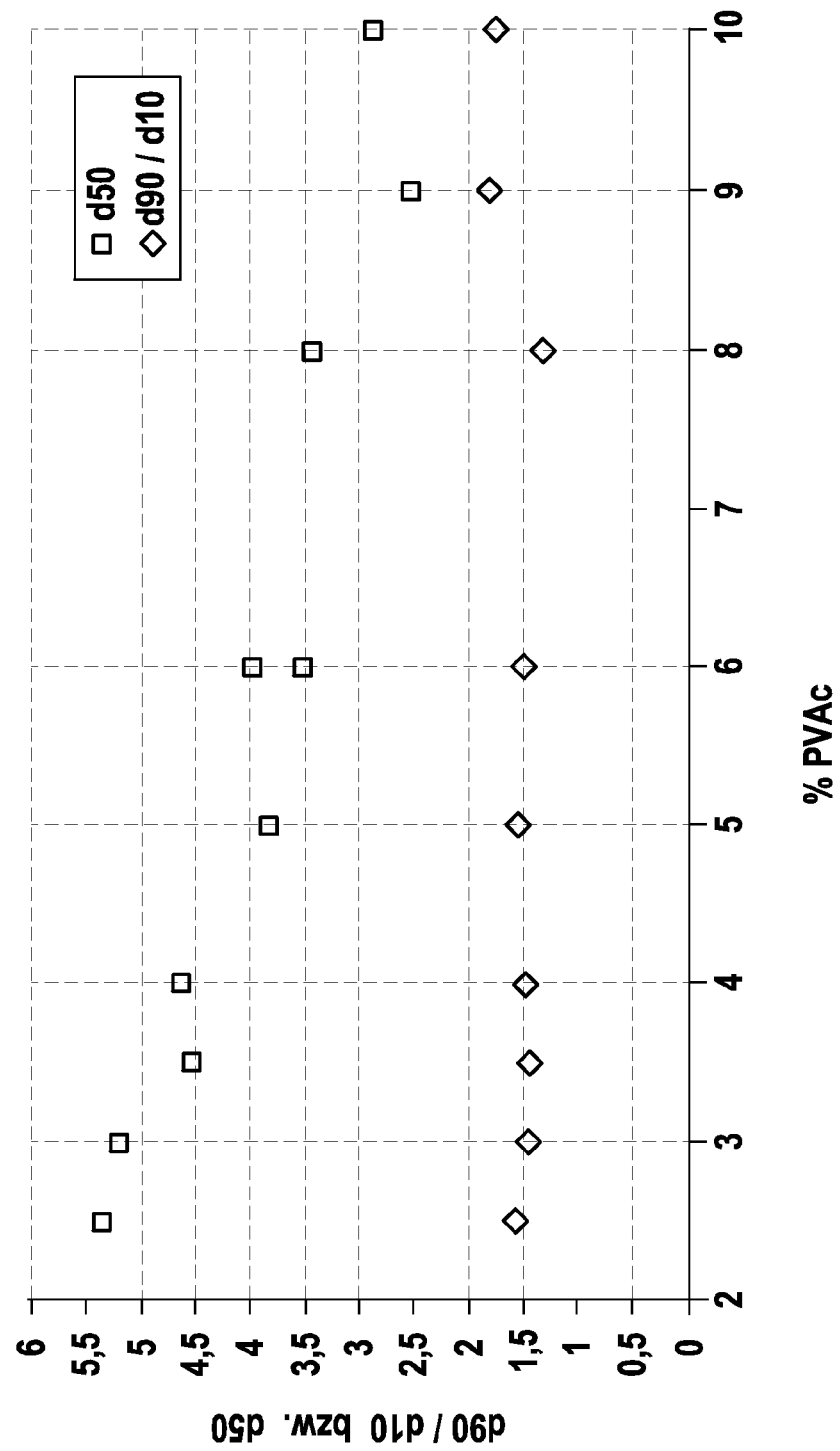

FIG. 36 shows a diagram of the dependence of the target quantities $d_{50}$ and $d_{90}/d_{10}$ on the PVAc concentration at T=85° C., NVP concentration=4.5% and AIBN concentration=1.4%.

The starting concentration of N-vinylpyrrolidone as monomer was only varied in a very narrow range, between 3% and 6%, and especially in the range between 4.5% and 5.3%. The influence of the NVP concentration proved to be significant, and at 4.5% somewhat larger particles having a narrower size distribution were found. In supplementary experiments, this trend was confirmed beyond the limits selected, between 2.5% and 5% of NVP.

The dependence of the particle size on the initiator concentration is described in most systems with increasing particle size at increasing initiator content. The grounds given for this in the literature are that more polymer chains precipitate out simultaneously with increasing free-radical concentration in the nucleation phase and these are able to coagulate to form larger particles before the stabilisation of the nuclei is complete [12, 14, 16, 19,21]. The opposite effect is described solely on the basis of empirical data [18]. Opposite effects are likewise observed in various solvents [11]. In our own experiments on the dispersion polymerisation of N-vinylpyrrolidone in propyl propionate with AIBN as initiator and PVAc as stabiliser, it has, surprisingly, been found that the particle size decreases significantly on increasing the concentration of AIBN from 0.5% to 2%. Further increases in the concentration of initiator do not result in a significant change in the particle size.

The influence of the stabilisation with respect to the particle size in the system investigated can be regarded as analogous to the model described in the literature. With increasing stabiliser concentration, it is possible to stabilise a larger surface area, which is ensured with a decrease in the particle size. Our own experiments have shown that, in agreement with the literature, more effective stabilisation is effected by PVAc having a higher molecular weight. With increasing temperature and increasing monomer concentration, the solubility of the polymer formed and of the stabiliser increases. This has on the one hand the consequence that the polymer only precipitates out from the reaction mixture in the case of a relatively high molecular weight, and the polymerisation thus takes place for longer in the mobile phase. On the other hand, the stabilising action of the stabiliser is reduced by its higher solubility, meaning that larger particles form due to more coagulation during the nucleation [11-22]. This agrees with the results of the experiments carried out here with respect to the reaction temperature. The experiments on changing the polarity by means of solvent mixtures also confirm this effect.

The literature describes a mechanistic model for the monodispersity in which the number of particles is defined after 20 minutes or before 5% conversion of the polymerisation [11-13]. From this time, only growth of the particles which takes place via absorption of the other monomers and oligomers takes place. In order to produce particles having a monodisperse distribution, sufficient nuclei must be formed at the beginning of the reaction in order to be able to absorb the remaining oligomers before they are stabilised to form new nuclei ("second nucleation"). The generation rate of precipitating polymer chains and the stabilisation rate during the nucleation phase can be influenced via the reaction temperature and the type and concentration of the initiator, monomer, solvent and stabiliser [11-22]. However, the change in the size distribution of the particles by variation of the influencing quantities is only described in the literature specifically for the corresponding systems with reference to empirically determined data.

Our own experiments have shown that the size difference in the particle populations can be influenced by variation of the concentrations of the initiator and monomer. This change in the monodispersity is not significantly evident via the value of $d_{90}/d_{10}$. FIG. 37 shows the change in the characteristics of the size distribution with varying concentration of AIBN. A further possibility of describing the particle size distribution is the quoting of the polydispersity index (PDI):

$$PDI = \frac{\text{average particle size based on vol \%}}{\text{average particle size based on the number}}$$

FIG. 37 shows the dependence of the size distribution on the concentration of AIBN, with 0.5% (1), 1.8% (2) and 4% (3).

TABLE 16

Comparison of the values of PDI and $d_{90}/d_{10}$ at varying monomer and AIBN concentration

|  | Parameter [%] | PDI | $d_{90}/d_{10}$ |
|---|---|---|---|
| [NVP] | 2.5 | 2.65 | 1.29 |
|  | 3.5 | 2.29 | 1.23 |
|  | 4.0 | 1.47 | 1.9 |
|  | 4.5 | 1.74 | 1.61 |
|  | 5.0 | 1.29 | 1.53 |
| [AIBN] | 0.5 | 1.59 | 1.53 |
|  | 1.4 | 1.74 | 1.61 |
|  | 1.8 | 1.54 | 1.77 |
|  | 2.4 | 1.1 | 1.77 |
|  | 3.0 | 1.15 | 1.71 |
|  | 4.0 | 1.09 | 1.64 |

Figure 1:
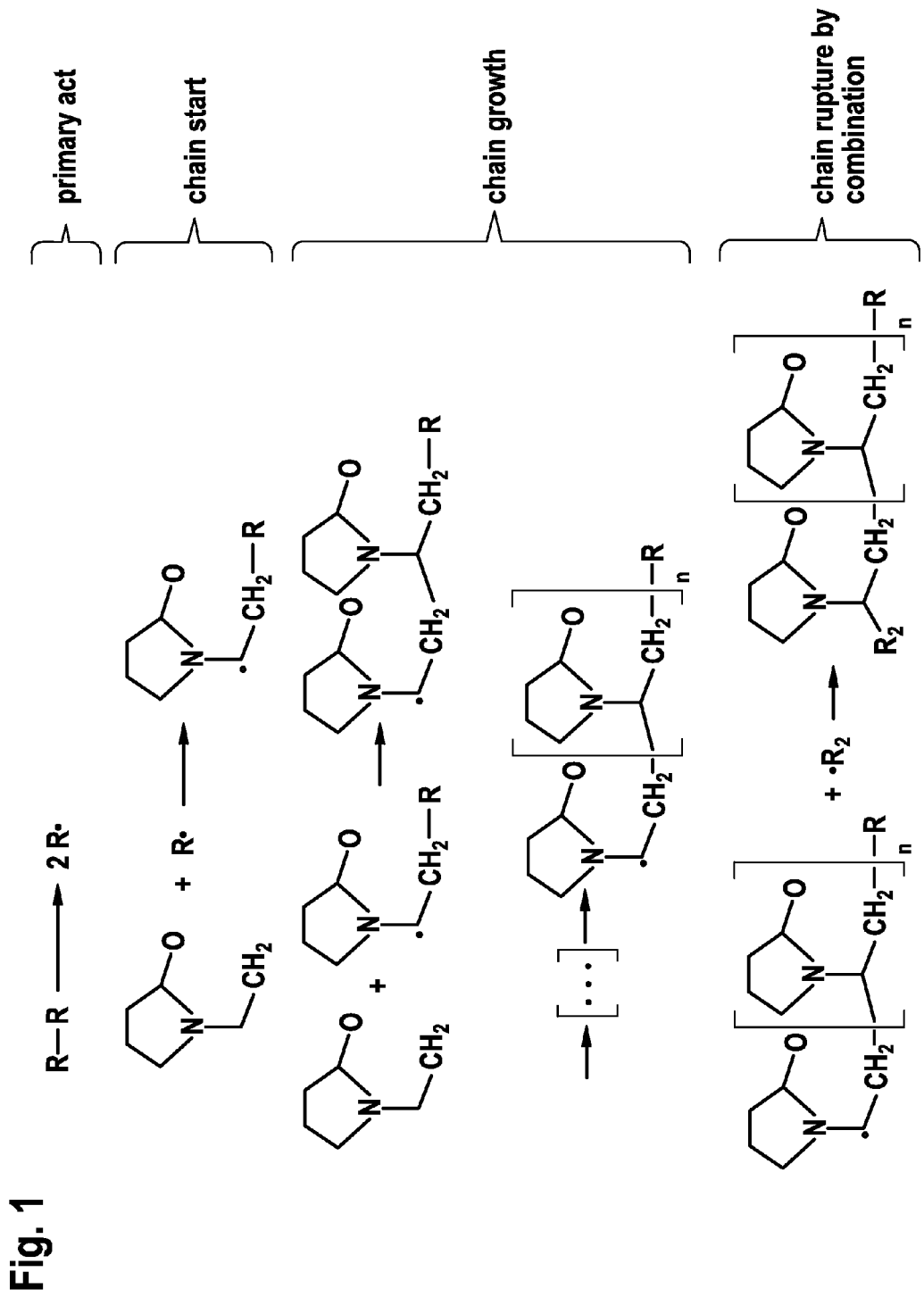
Figure 2:
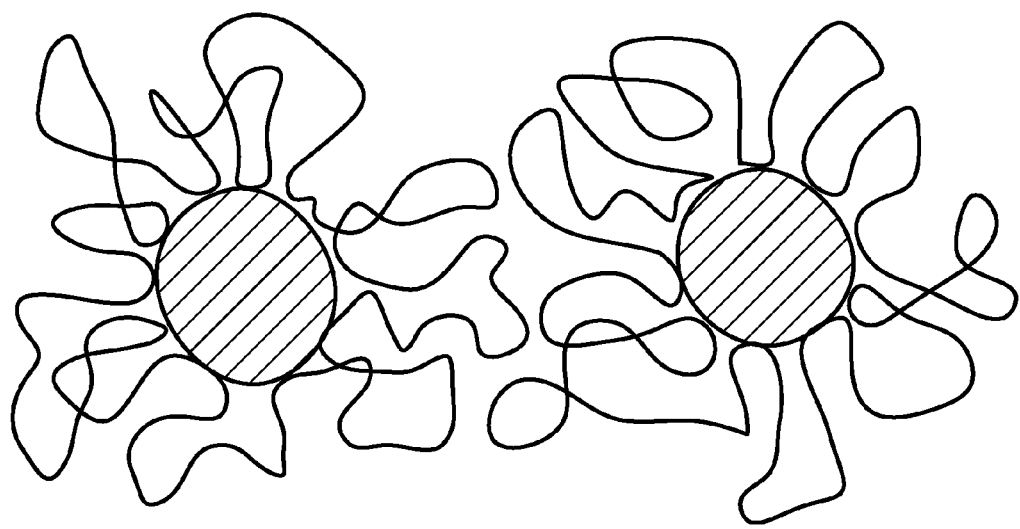
Figure 3:
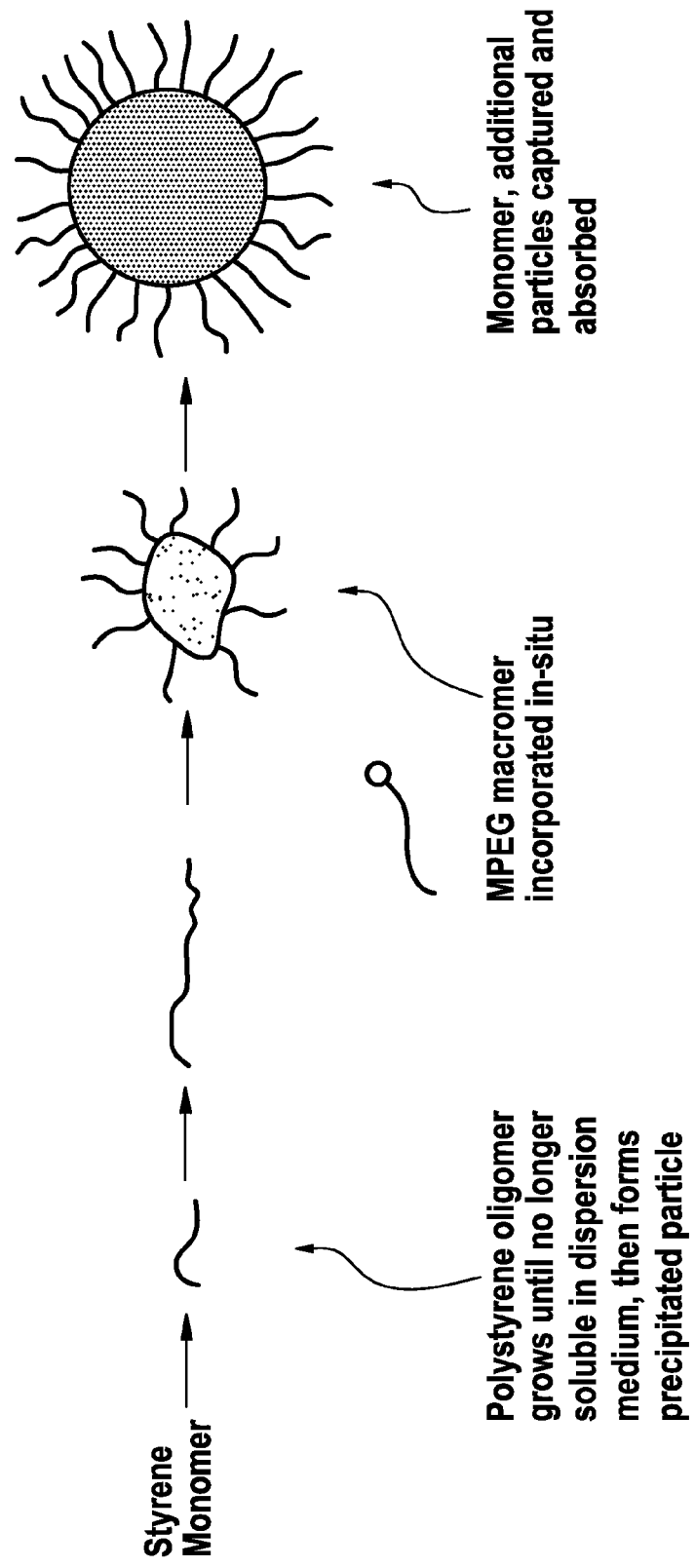
Figure 4:
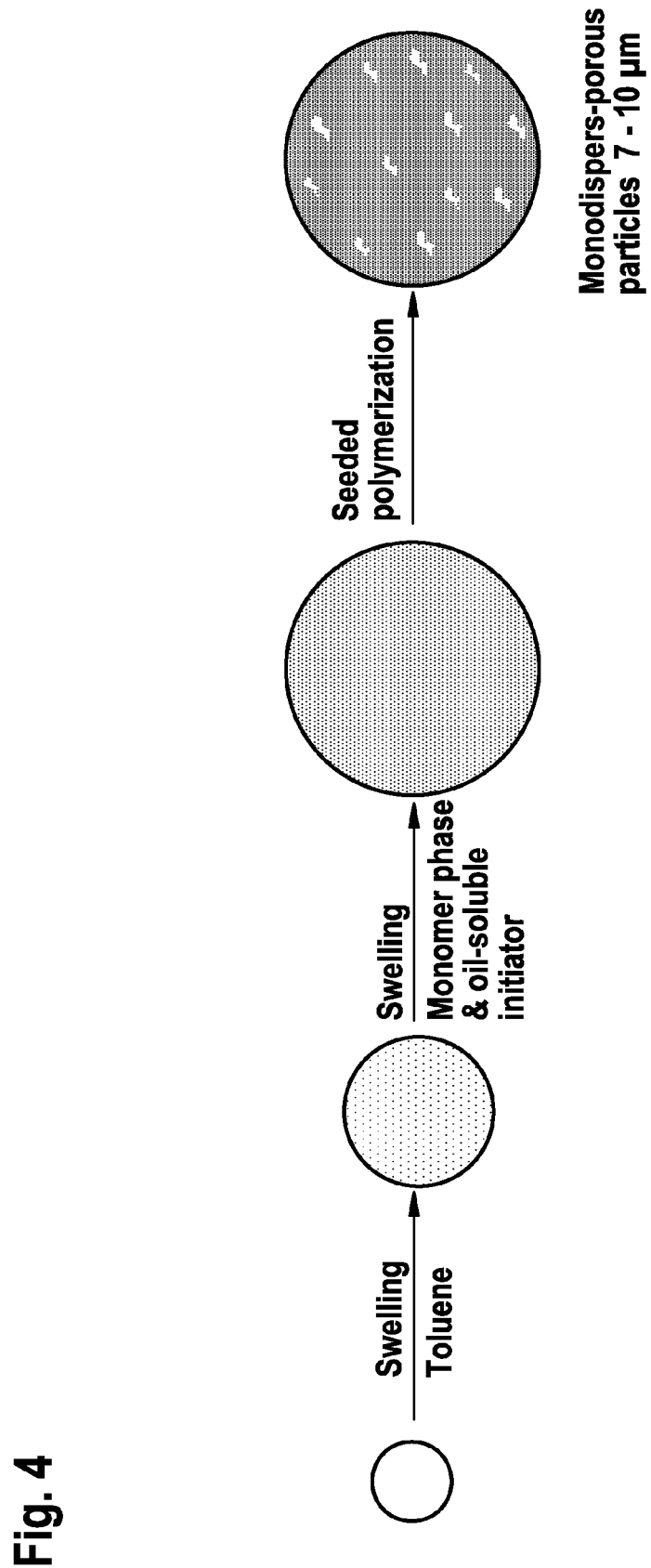
Figure 5:
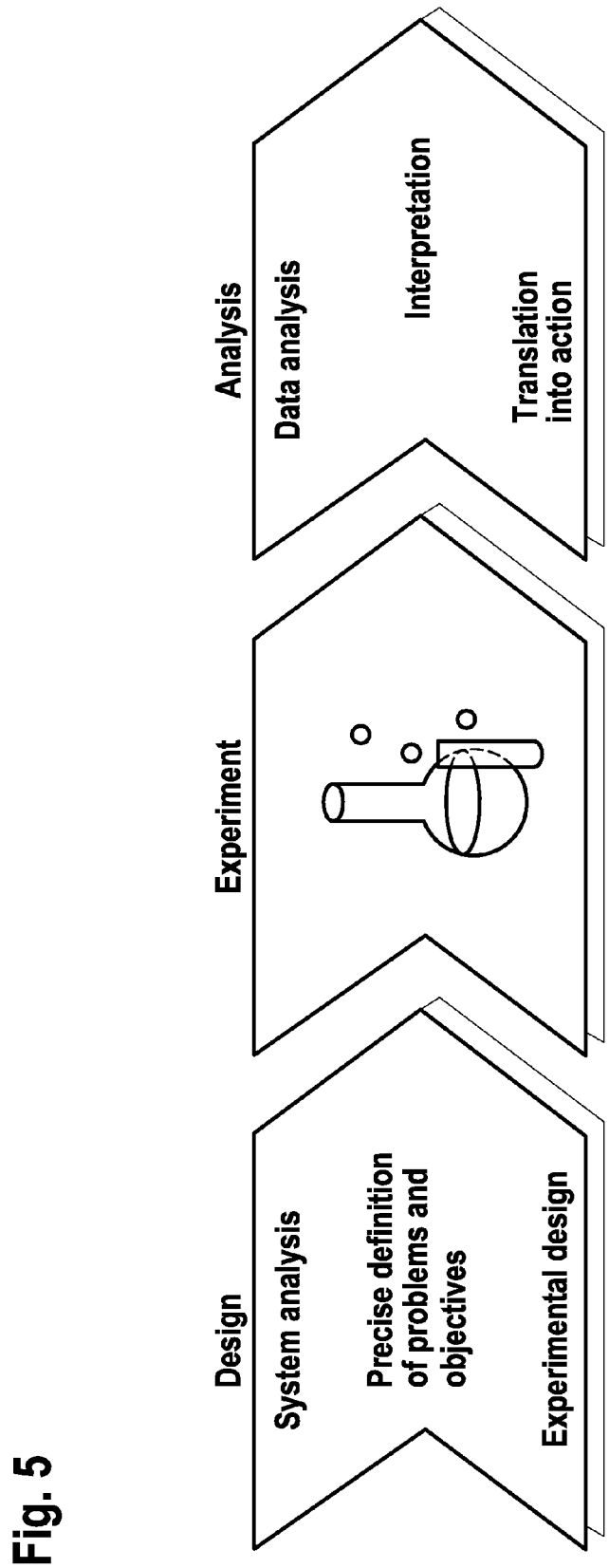
Figure 6:
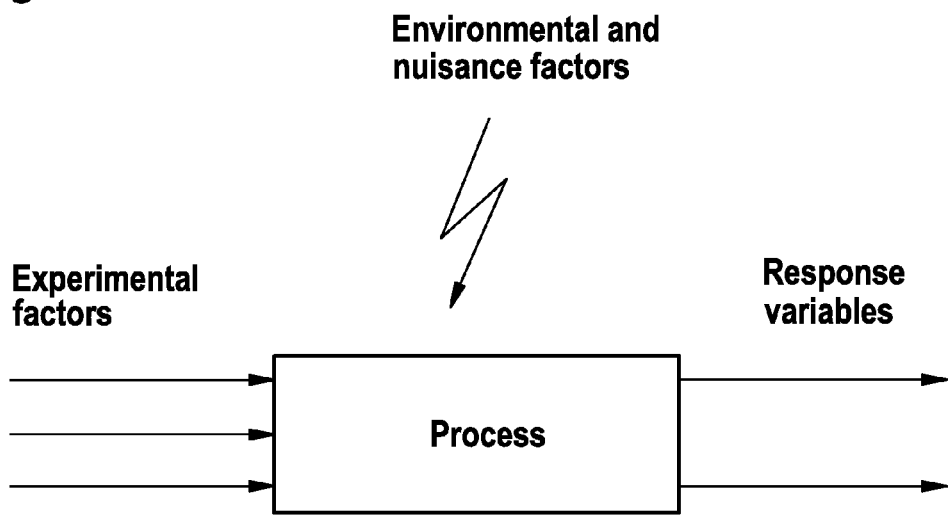
Figure 7:
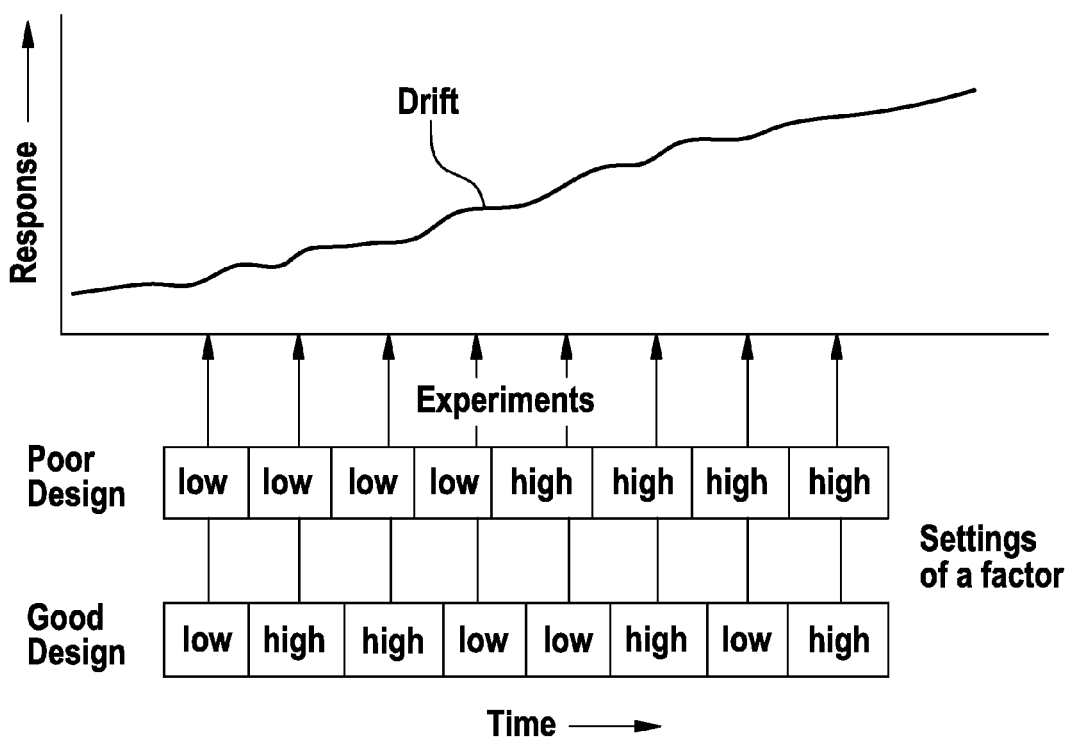
Figure 8:
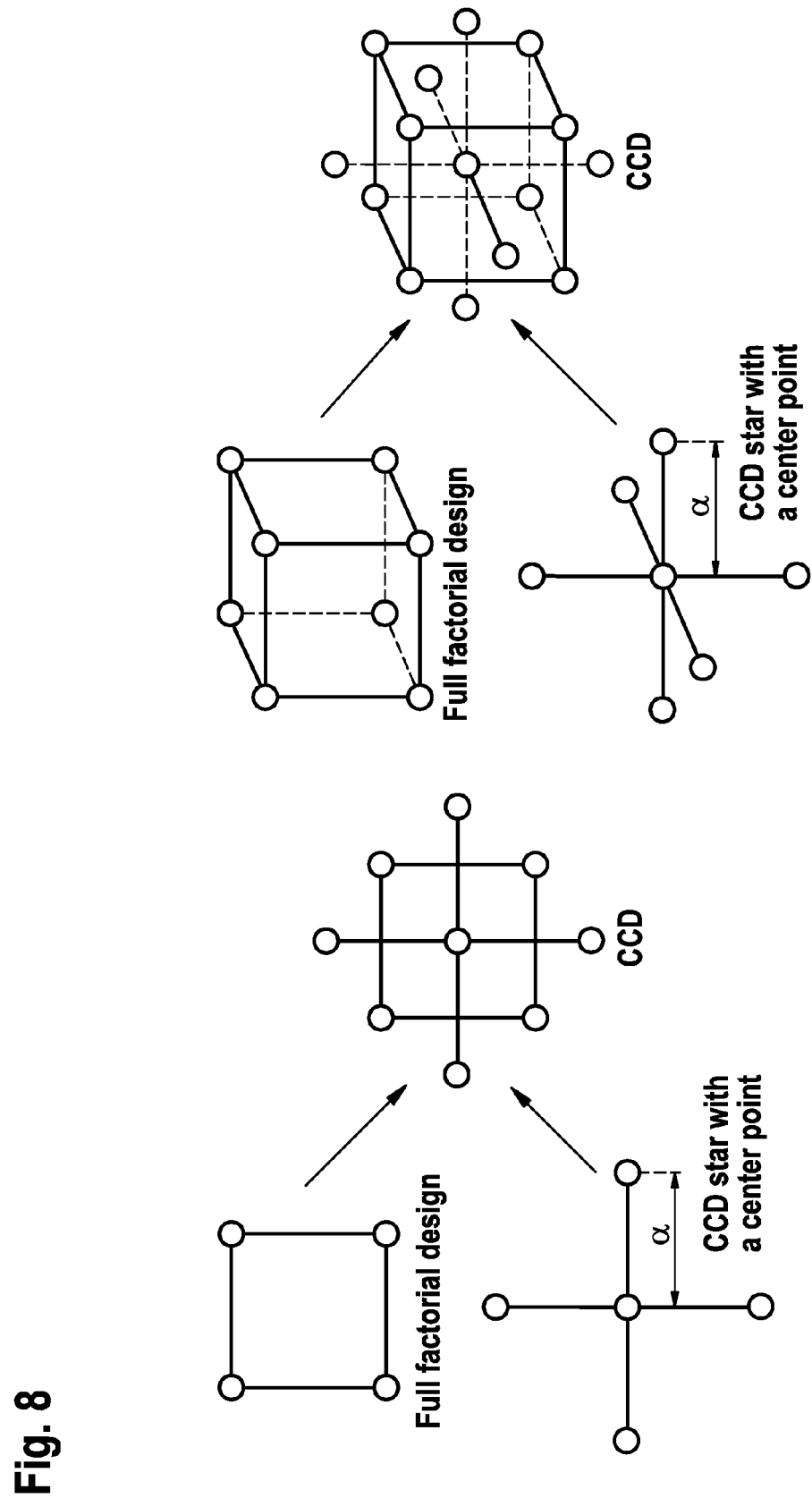
Figure 9:
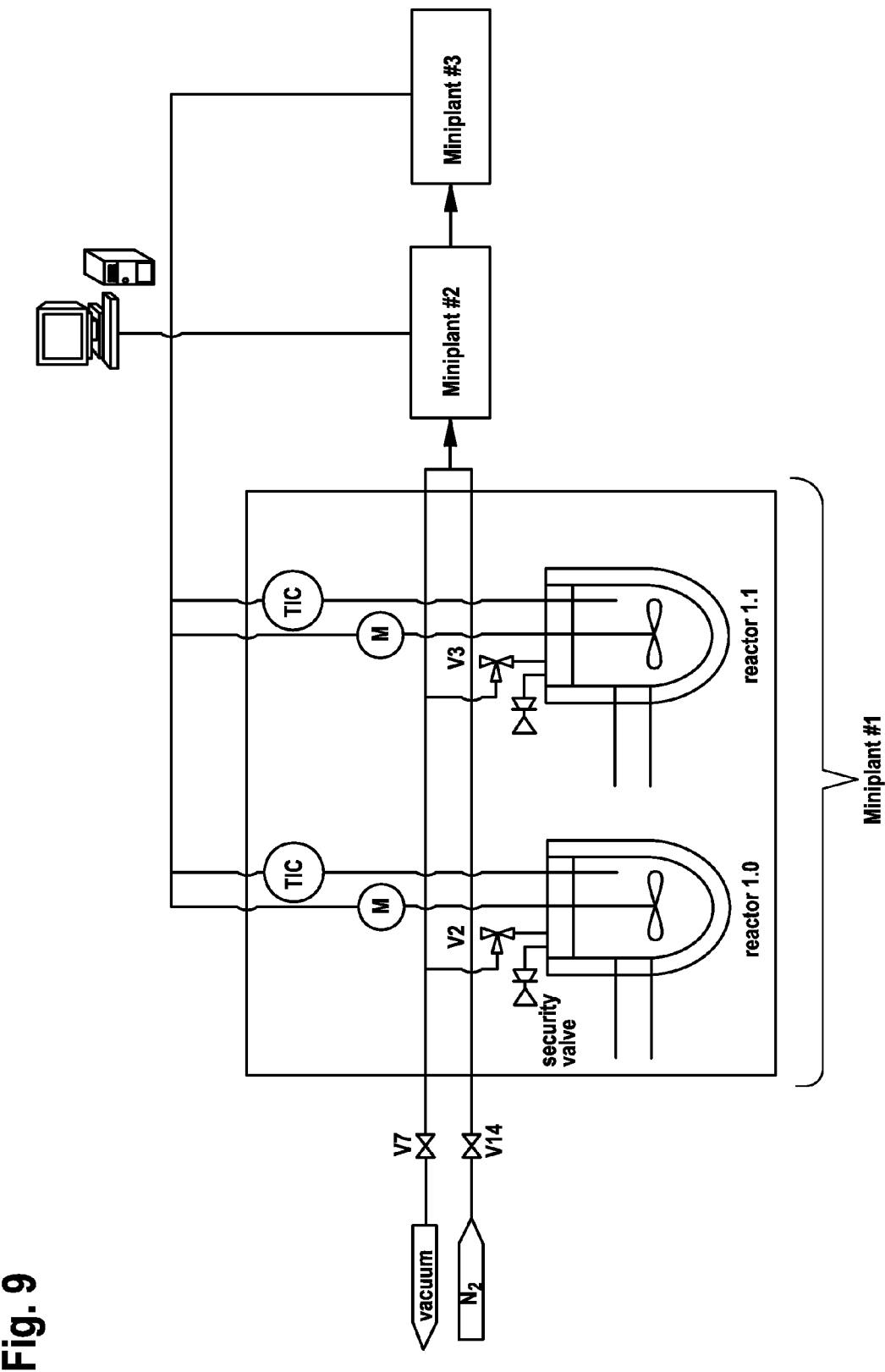
Figure 10:
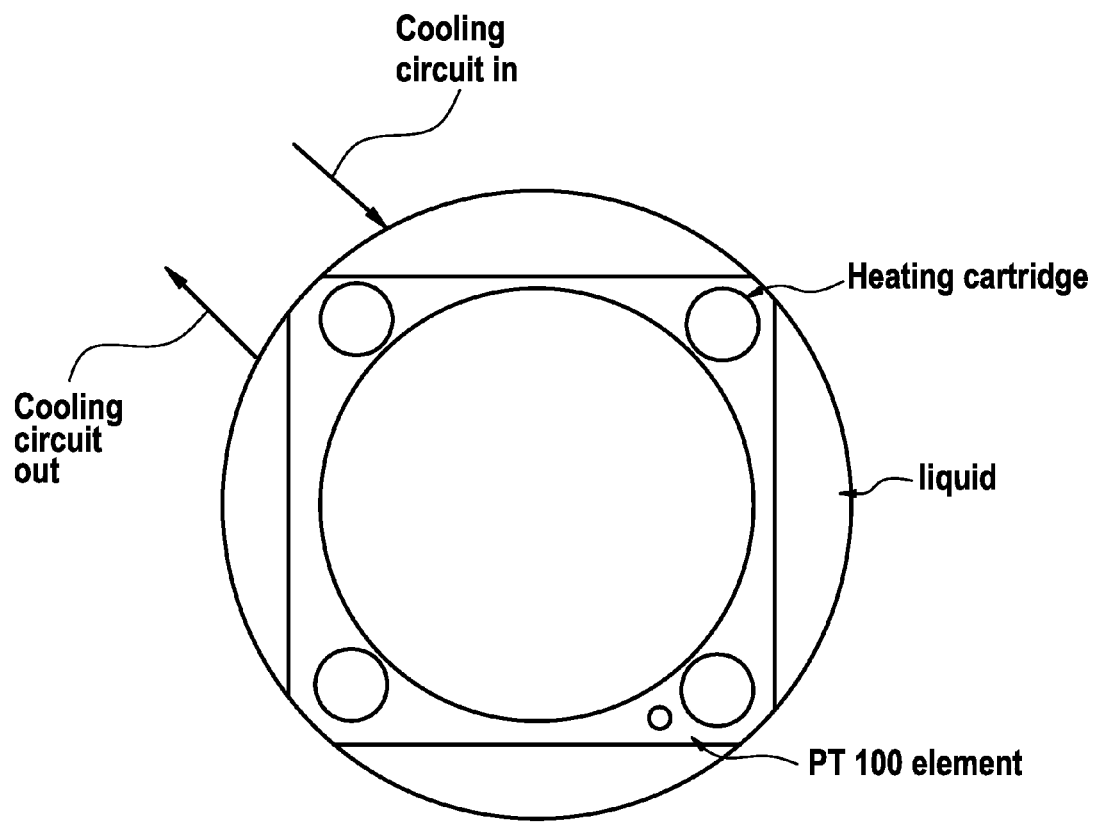
Figure 11:
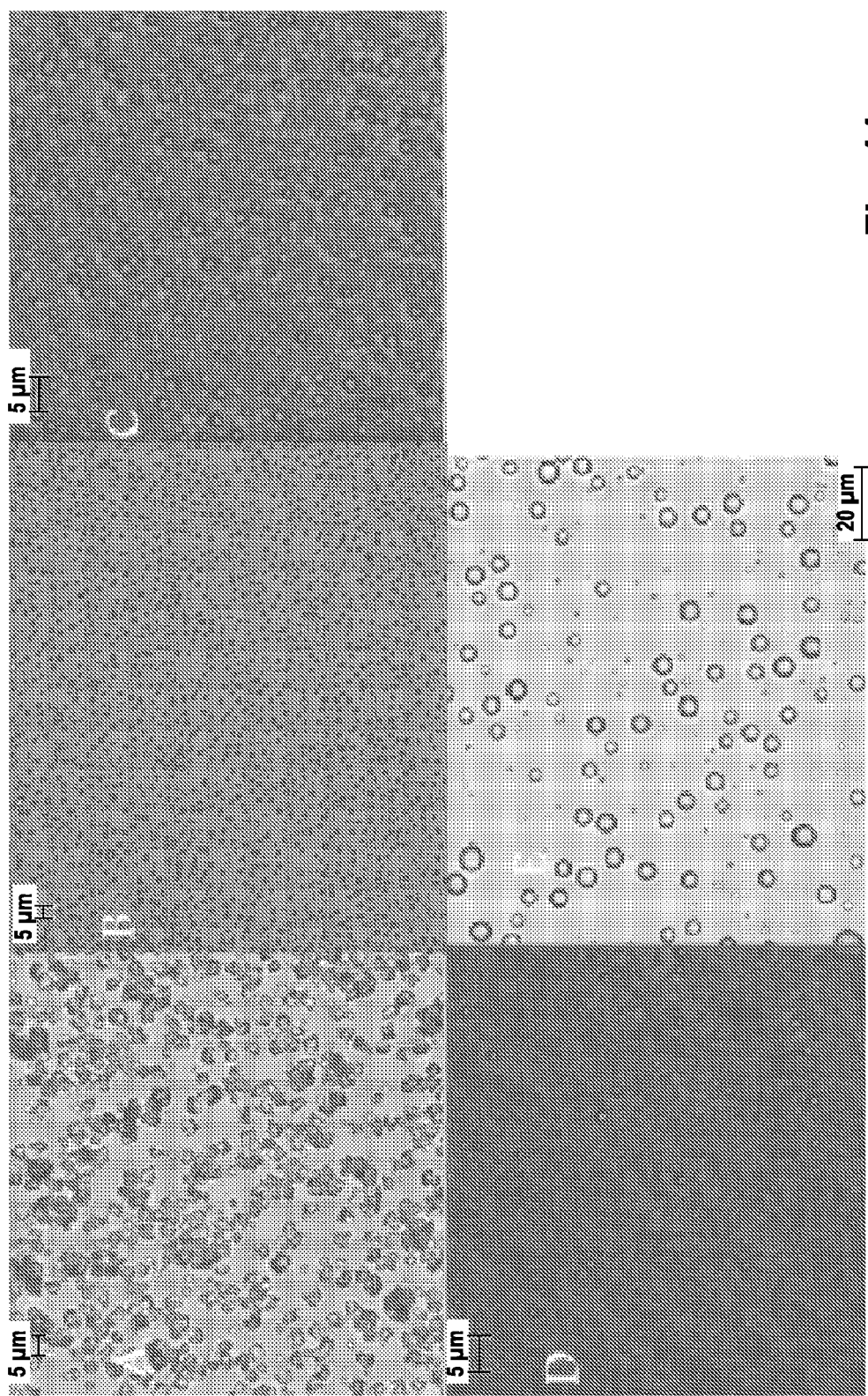
Figure 12:
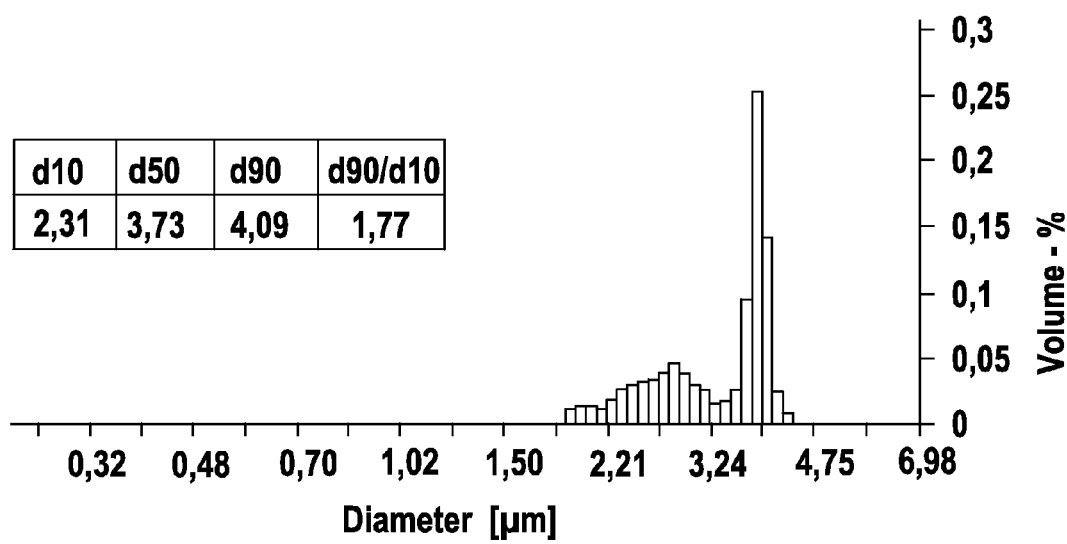
Figure 13:
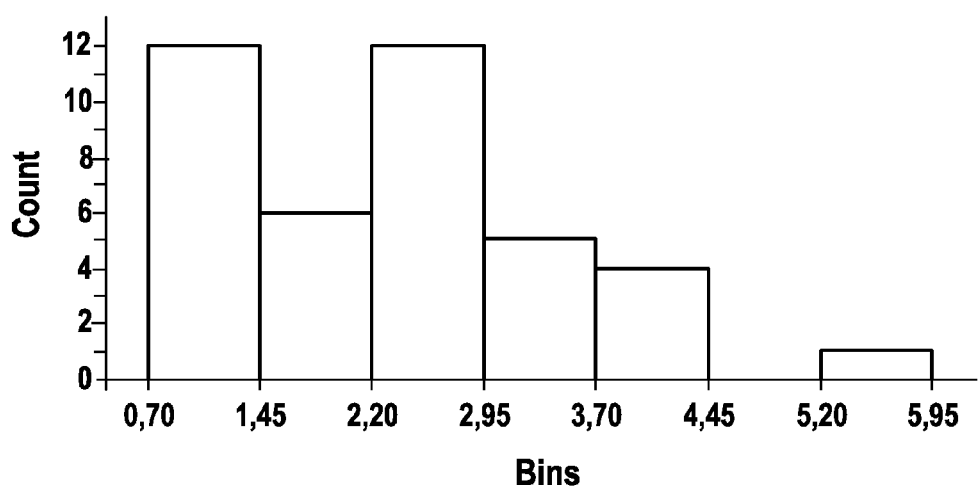
Figure 14:
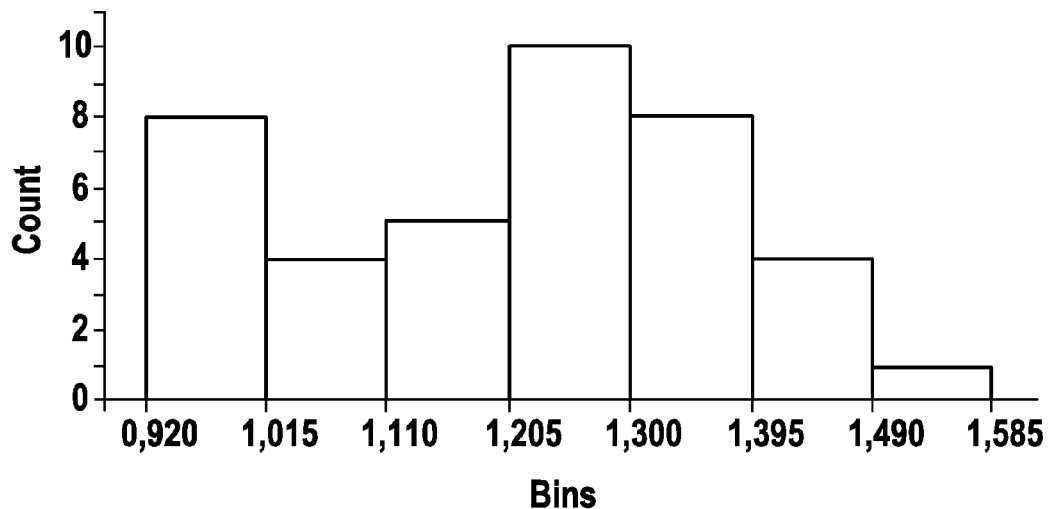
Figure 15:
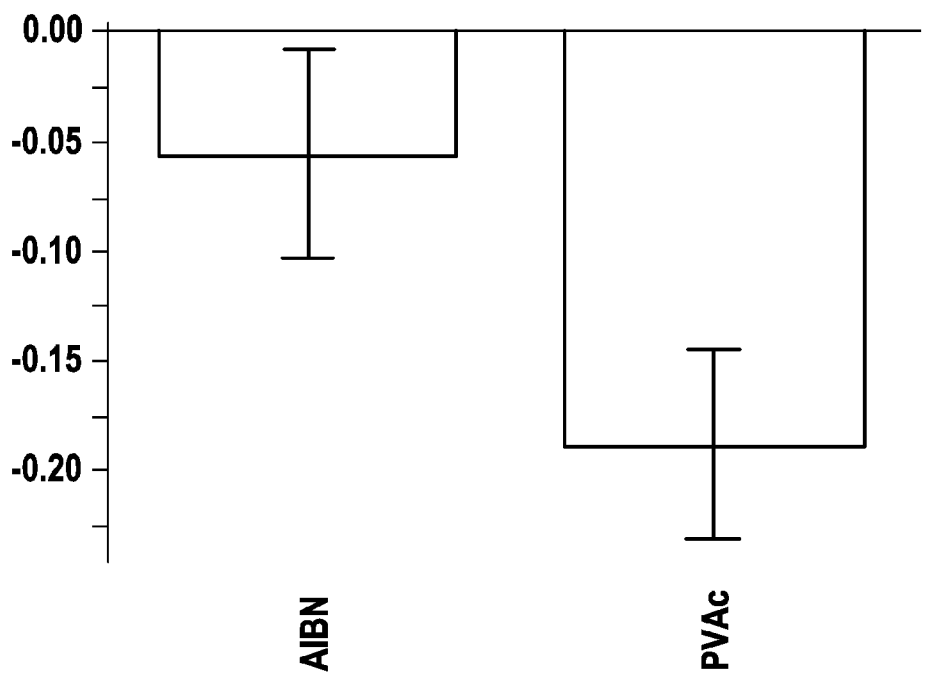
Figure 17:
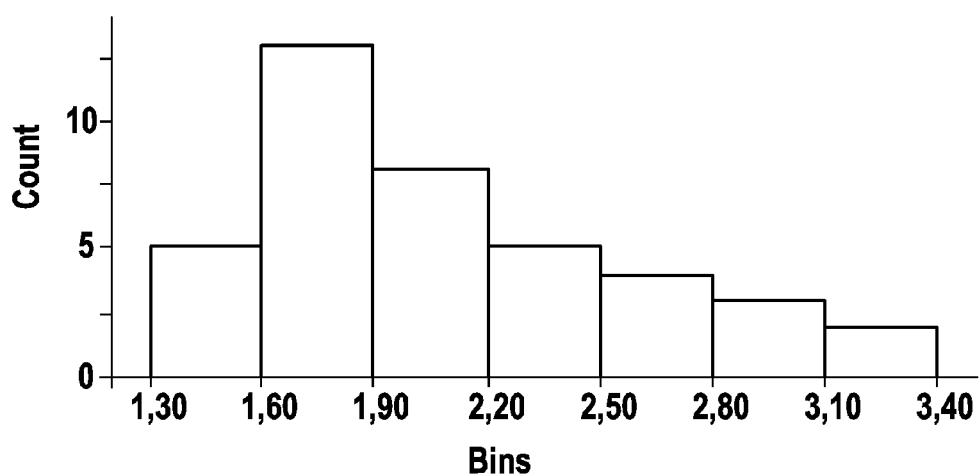
Figure 18:
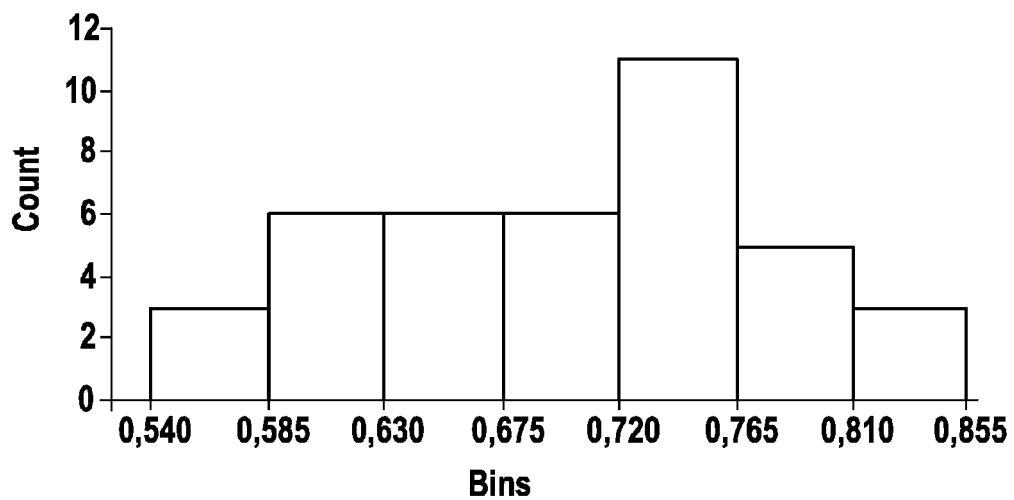
Figure 19:
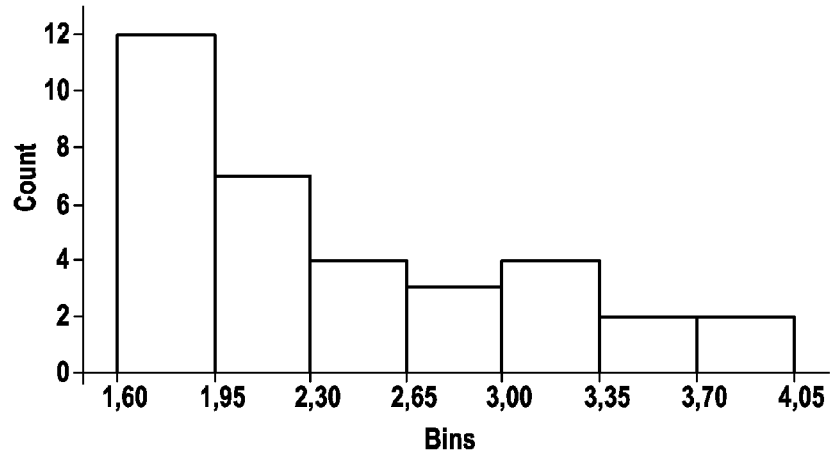
Figure 20:
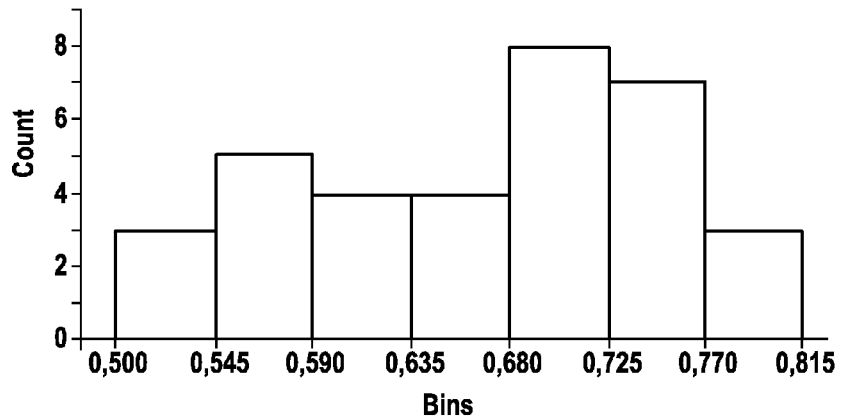
Figure 21:
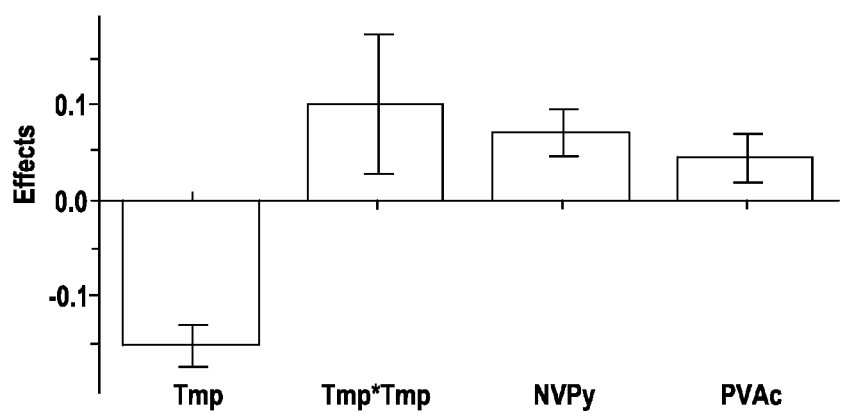
Figure 22:
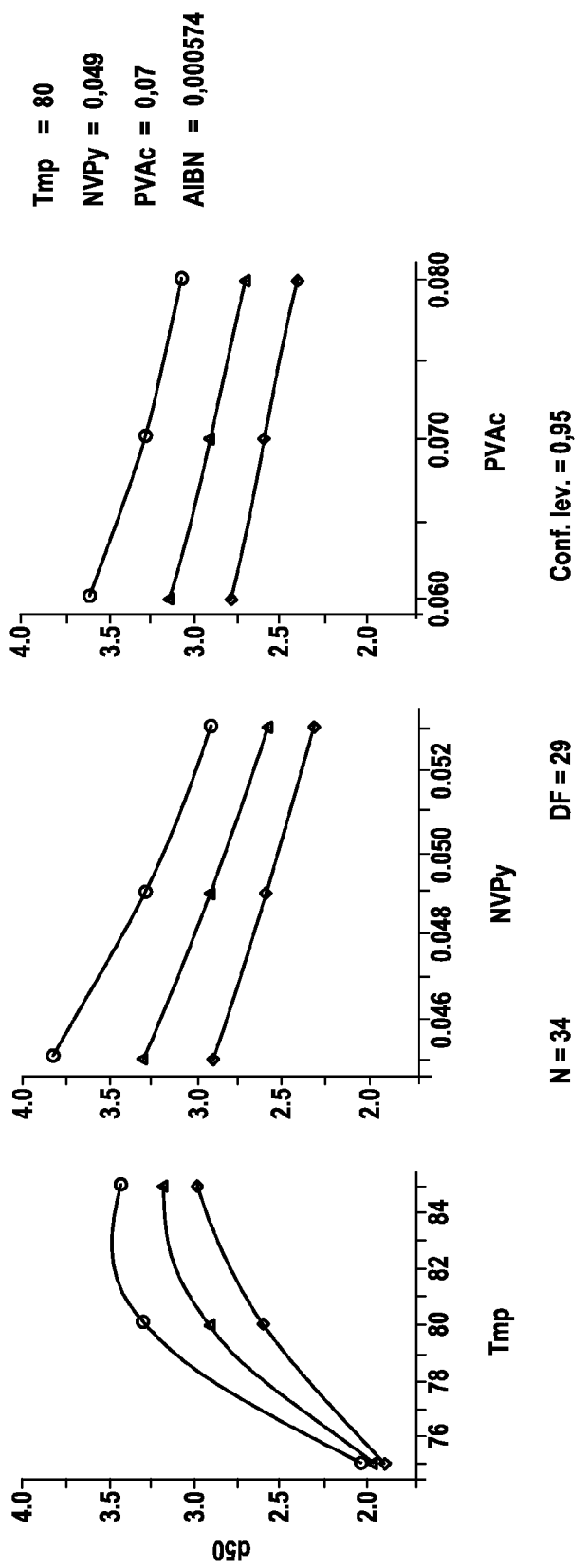
FIG. 22 shows a one-dimensional model prediction for the change in the $d_{50}$ value as a function of the temperature and the concentrations of NVPy and PVAc.

List of Abbreviations
[x]=concentration of x
AIBN=azobisisobutyronitrile
DJA=double-jacket apparatus
DVC=divinyl compound
M100=Multiplant 100 (automatic synthesiser)
MW=molecular weight
NVP=N-vinylpyrrolidone
PAA=polyacrylic acid
PVAc=polyvinyl acetate
PVME=polyvinyl methyl ether
List of Tables
Tab. 1: Linear, quadratic and interaction terms for two factors and three factors
Tab. 2: Solvents and precipitants for polyvinylpyrrolidone from the product description of BASF Luvitec® K products [31]
Tab. 3: Selected solvents and results of the preliminary experiments on determination of the solubilities
Tab. 4: Solubilities of the steric stabilisers
Tab. 5: Summary of the preliminary experiments on the suitability of various solvents and stabilisers
Tab. 6: Components of the system investigated
Tab. 7: Parameter ranges for the first experiment plan
Tab. 8: Results from repetition measurements
Tab. 9: First experiment plan with results for the individual experiments
Tab. 10: Parameter ranges for the second experiment plan
Tab. 11: Second experiment plan with results for the target quantities
Tab. 12: Influence of dioxane
Tab. 13: Data for the first scale-up experiment
Tab. 14: Comparison of the batches from M100 and DJA
Tab. 15: Results of the swelling experiments carried out
Tab. 16: Comparison of the values of PDI and $d_{90}/d_{10}$ at varying monomer and AIBN concentration Brief Description Of Drawings FIG. 1: Reaction steps in the free-radical polymerisation of vinylpyrrolidone
FIG. 2: Diagrammatic principle of action of steric stabilisation
FIG. 3: Course of the formation and development of polymer particles during dispersion polymerisation for the example of the polymerisation of styrene with a functional macromer as steric stabiliser [14]
FIG. 4: Example of the growth sequence in seed polymerisation [5]
FIG. 5: Phases in the use of a DoE
FIG. 6: Input/output model of a process or system
FIG. 7: Depiction of the influence of time-dependent interferences for the example of instrument drift and the advantage of a randomised experiment plan
FIG. 8: Spatial arrangement of the experiment points for two factors (left) and three factors (right)
FIG. 9: Simplified flow chart for describing the functioning of the Multiplant M100
FIG. 10: Function principle of jacket temperature control (plan view)
FIG. 11: Photomicrographs of PVP particles from the preliminary experiments, characteristic of the systems with PVME, PVAc MW 140k, PVAc MW 500k, PVAc MW 50k as stabiliser in propyl propionate (B-E) and in ethyl acetate (A)
FIG. 12: Example of a volume-% distribution diagram with the calculated values of $d_{10}$, $d_{50}$, $d_{90}$ and monodispersity
FIG. 13: Distribution of the original measurement values of $d_{50}$
FIG. 14: Distribution of the transformed measurement values of $d_{50}$
FIG. 15: Model coefficients with corresponding confidence ranges (reduced model)
FIG. 16: One-dimensional (left) and two-dimensional (right) model prediction for the change in $d_{50}$
FIG. 17: Distribution of the original measurement values of $d_{90}/d_{10}$
FIG. 18: Distribution of the transformed measurement values of $d_{90}/d_{10}$
FIG. 19: Distribution of the original measurement values
FIG. 20: Distribution of the transformed measurement values
FIG. 21: Model coefficients with corresponding confidence ranges for $d_{50}$
FIG. 22: One-dimensional model prediction for the change in $d_{50}$
FIG. 23: Two-dimensional model prediction for the change in $d_{50}$ at the average level of AIBN and [PVAc] at 6%, 7%, 8% (from left to right)
FIG. 24: Distribution of the transformed measurement values
FIG. 25: Assessment of the reproducibility FIG. 26: Model coefficients with corresponding confidence ranges for $d_{90}/d_{10}$ FIG. 27: Example of a batch having a bimodal size distribution FIG. 28: Results on increasing the ethanol concentration from 1% to 1.5%

FIG. 29: Dependence of $d_{50}$ and $d_{90}/d_{10}$ on the dioxane proportion

FIG. 30: Experiments with 0%, 2% and 20% of dioxane

FIG. 31: Comparison of the batches from M100 (left) and DJA (right)

FIG. 32: Comparison of the batches from M100 and DJA with 2% of DVC

FIG. 33: Effect of the addition of NVP to the original reaction mixture followed by polymerisation FIG. 34: Dependence of the target quantities $d_{50}$ and $d_{90}/d_{10}$ on the reaction temperature for [NVP]=4.5%, [AIBN]=1.4%, [PVAc]=6%

Figure 35:
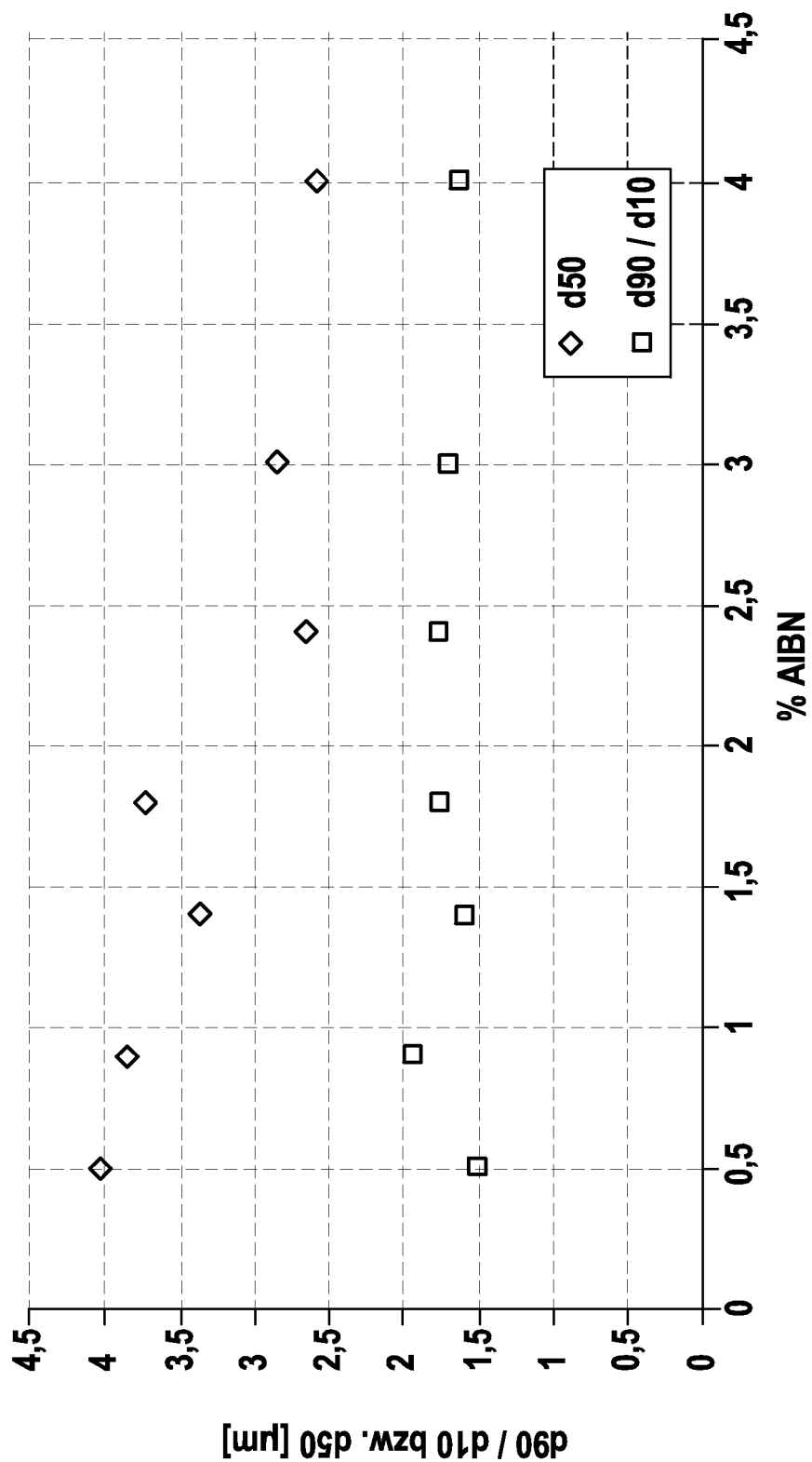

FIG. 35: Dependence of the target quantities $d_{50}$ and $d_{90}/d_{10}$ on the AIBN concentration at T=85° C., [NVP]=4.5%, [PVAc]=6%

FIG. 36: Dependence of the target quantities $d_{50}$ and $d_{90}/d_{10}$ on the PVAc concentration at T=85° C., [NVP]=4.5%, [AIBN]=1.4%

FIG. 37: Dependence of the size distribution on [AIBN], with 0.5% (1), 1.8% (2) and References

[1] Tomohiko Kimura; Masashi Teramachi; Ken Hosoya; U.S. Pat. No. 6,482,867
[2] J. Ugelstad, L. Södeberg, A. Berge, J. Bergström; *Nature*, 303 (1983) 95
[3] O. Kim, K. Lee, K. Kim, B. Lee, S. Choe; *Polymer* 47 (2006) 1953
[4] V. Smigol, F. Svec, J. Fréchet; *Anal. Chem.*, 66 (1994) 2129
[5] E. Unsal, S. T. Camli, M. Tuncel, S. _enel, A. Tuncel; *Reactive & Functional Polymers*, 61 (2004) 353
[6] E. Unsal, A. Durdu, B. Elmas, M. Tuncel, A. Tuncel; *Anal Bioanal Chem*, 383 (2005) 930
[7] F. Wu, Y. Zhu, Z. Jia; *Journal of Chromatography A*, 1134 (2006) 45
[8] K. Takahashi, S. Miyamori, H. Uyama, S. Kobayashi; *Macromol. Rapid Commun.*, 18 (1997) 471
[9] K.-C. Lee, S.-E. Lee, Y.-J. Choi; *Macromolecular Research*, 12 (2004) 213
[10] T. Ellingsen, O. Aune, J. Ugelstad, S. Hagen; *Journal of Chromatography A*, 535 (1990) 147
[11] D. Horák, P. Shapoval; *Journal of Polymer Science: Part A: Polymer Chemistry*, 38 (2000) 3855
[12] A. Paine, J. Luymes, J. McNulty; *Macromulecules*, 23 (1990) 3104
[13] A. Paine; *Macromulecules*, 23 (1990) 3109
[14] J. Shay, R. English, R. Spontak, C. Balik, S. Khan; *Macromolecules*, 33 (2000) 6664
[15] D. Horák; *Progr Colloid Polym Sci*, 124 (2003) 77
[16] D. Horák, M. Kryštufek, J. Spevácek; *Journal of Polymer Science: Part A: Polymer Chemistry*, 38 (2000) 653
[17] C.-H. Chen, W.-C. Lee; *Journal of Polymer Science: Part A: Polymer Chemistry*, 37 (1999) 1457
[18] K. Lok, C. Ober; *Can. J. Chem.* 63 (1985) 209
[19] W. Yang, J. Hu, Z. Tao, L. Li, C. Wang, S. Fu; *Colloid Polym Sci*, 277 (1999) 446
[20] C. Ober, K. Lok; *Macromolecules*, 20 (1987) 268
[21] C. Tseng, Y. Lu, M. El-Aasser, J. Vanderhoff; *Journal of Polymer Science: Part A: Polymer Chemistry*, 24 (1986) 2995
[22] K. Barrett, H. Thomas; *Journal of Polymer Science: Part A: Polymer Chemistry*, 7 (1969) 2621
[23] J. Ugestad, K. Kaggerud, F. Hansen, A. Berge; *Makromol. Chem.*, 180 (1979) 737
[24] A. Tuncel, M. Tuncel, H. Cicek, O. Fidanboy; *Polym Int*, 51 (2001) 75
[25] A. Tuncel, M. Tuncel, B. Ergun, C. Alagöz, T. Bahar; *Colloids and Surfaces A: Physiochemical and Engineering Aspects*, 197 (2002) 79
[26] A. Jose, S. Ogawa, M. Bradley; *Polymer*, 46 (2005) 2880
[27] B.-L. Gong, C.-Y. Ke, X.-D. Geng; *Chinese Journal of Chemistry* 22 (2004) 283
[28] J. Ugelstad; *Makromol. Chem.*, 179 (1978) 815
[29] S. Soravia, A. Orth; *Ullmann' Moddeling and Simulation, Fritz Ullmann*, Wiley-VCH
[30] Wilhelm Kleppmann-Taschenbuch Versuchsplanung (Hanser)
[31] www.spp-prozess-spray.uni-bremen.de/spp_1423-Dateien/PVP_techn.pdf
[32] S. Kobayashi, H. Uyama, J. Choi, Y. Matsumoto; *Proceedings of Japan Academy. Ser. B.: Physical and Biological Sciences*, 67 (1991) 140
[33] C. Wood, A. Cooper; *Macromolecules*, 36 (2003) 7534
[34] WO/1995/022639
[35] J. Ugelstad; *Macromolecular Chemistry and Physics*, 179 (1978) 815-817
[36] E. Sudol, M. El-AAsser, J. Vanderhoff; *Journal of Polymer Science: Part A: Polymer Chemistry* 24 (1986) 3499
[37] C. Cheng, J. Vanderhoff, M. El-Aassar; *Journal of Polymer Science: Part A: Polymer Chemistry*, 30 (1992) 235
[38] Thieme Römpp online

The invention claimed is:

1. A process for preparing polymer particles having a polydispersity index of PDI<1.1 and pronounced sphericity, comprising polymerizing N-vinylpyrrolidone in the presence of ethanol, isopropanol or dioxane, and polyvinyl acetate in an amount of 0.8 to 18% by weight as stabilizer, or a mixture thereof and optionally in a mixture with water, and obtaining the resultant polyvinylpyrrolidone as polymer particles from the resultant dispersion.

2. A process according to claim 1, wherein the obtained polymer particles are used as seed particles for the production of porous hydrophilic polymer particles.

3. A process according to claim 1, wherein the polymerization is carried out in the presence of a crosslinking agent in a concentration of 0.5 to 2.5% by weight.

4. A process according to claim 1, wherein the polymerization is carried out in the presence of ethanol and/or isopropanol in an amount of 0.5 to 10% by weight.

5. A process according to claim 1, wherein the polymerization is carried out in the presence of dioxane in a concentration of 1 to 11% by weight.

6. A process according to claim 1, wherein a monomer concentration of N-vinylpyrrolidone in an amount of 2 to 10% by weight is present during polymerization.

7. A process according to claim 1, wherein the polymerization is carried out in the presence of a stabilizer in an amount of 2.5 to 10% by weight.

8. A process according to claim 7, wherein the polymerization is carried out in the presence of an initiator.

9. A process according to claim 8, wherein the initiator is added in an amount of 0.2 to 5% by weight.

10. A process according to claim 8, wherein the initiator is azobisisobutyronitrile.

11. A process according to claim 1, wherein the polymerization is carried out at a temperature of 60 to 90° C.

12. A method for chromatographic separation, comprising achieving separation by the polymer particles produced by a process according to claim 1.

13. A method for the production of macroporous polymer particles for preparative or analytical chromatography in protein preparation, comprising seeding with the polymer particles produced by a process according to claim 1.

14. Polymer particles produced by a process according to claim 1, having average particle diameters in the range from <1 μm to 5 μm and a polydispersity index of PDI<1.1.

15. A process according to claim 1, wherein the prepared polymer particles have average particle diameters in the range from <1 μm to 5 μm.

16. A process according to claim 1, wherein the prepared polymer particles have average particle diameters in the range from 4 μm to 5 μm.

17. A process according to claim 1, wherein the polymerization is carried out in the presence of a stabilizer in an amount of 6 to 10% by weight.

18. A process according to claim 1, wherein the polymerization is carried out in the presence of ethanol and/or isopropanol in an amount of 5% by weight.

19. A process according to claim 1, wherein the polymerization is carried out in the presence of dioxane in a concentration of 5 to 10% by weight.

20. A process according to claim 1, wherein a monomer concentration of N-vinylpyrrolidone in an amount of 2% by weight is present during polymerization.

* * * * *